US012764200B2

(12) United States Patent
Guim Bernat et al.

(10) Patent No.: US 12,764,200 B2
(45) Date of Patent: Oct. 13, 2026

(54) INFRASTRUCTURE-DELEGATED ORCHESTRATION BACKUP USING NETWORKED PROCESSING UNITS

(71) Applicant: Intel Products IP LLC, Santa Clara, CA (US)

(72) Inventors: Francesc Guim Bernat, Barcelona (ES); Christian Maciocco, Portland, OR (US); Kshitij Arun Doshi, Tempe, AZ (US); Karthik Kumar, Chandler, AZ (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/090,786

(22) Filed: Dec. 29, 2022

(65) Prior Publication Data

US 2023/0132992 A1 May 4, 2023

Related U.S. Application Data

(60) Provisional application No. 63/425,857, filed on Nov. 16, 2022.

(51) Int. Cl.
*H04L 67/63* (2022.01)
*G06F 9/30* (2018.01)
(Continued)

(52) U.S. Cl.
CPC ............ *H04L 67/63* (2022.05); *G06F 9/3005* (2013.01); *G06F 9/3885* (2013.01);
(Continued)

(58) Field of Classification Search
None
See application file for complete search history.

(56) References Cited

U.S. PATENT DOCUMENTS 7,065,764 B1 6/2006 Prael et al.
7,716,336 B2 5/2010 Coppinger et al.
(Continued)

OTHER PUBLICATIONS

Hu, Shuihai, "Deadlocks in Datacenter Networks: Why Do They Form, and How To Avoid Them", HotNets-XV, (Nov. 2016), 7 pgs.
(Continued)

*Primary Examiner* — Fadi Haj Said
(74) *Attorney, Agent, or Firm* — Schwegman Lundberg & Woessner, P.A.

(57) ABSTRACT

Various approaches for monitoring and responding to orchestration or service failures with the use of infrastructure processing units (IPUs) and similar networked processing units are disclosed. A method performed by a computing device for deploying remedial actions in failure scenarios of an orchestrated edge computing environment may include: identifying an orchestration configuration of a controller entity (responsible for orchestration) and a worker entity (subject to the orchestration to provide at least one service); determining a failure scenario of the orchestration of the worker entity, such as at a networked processing unit implemented at a network interface located between the controller entity and the worker entity; and causing a remedial action to resolve the failure scenario and modify the orchestration configuration, such as replacing functionality of the controller entity or the worker entity with functionality at a replacement entity.

22 Claims, 12 Drawing Sheets

(51) Int. Cl.

| | |
|---|---|
| ***G06F 9/38*** | (2018.01) |
| ***G06F 9/48*** | (2006.01) |
| ***G06F 9/50*** | (2006.01) |
| ***G06F 9/54*** | (2006.01) |
| ***G06F 11/07*** | (2006.01) |
| ***G06F 12/0846*** | (2016.01) |
| ***G06F 12/0873*** | (2016.01) |
| ***H04L 9/40*** | (2022.01) |
| ***H04L 41/5003*** | (2022.01) |
| ***H04L 67/10*** | (2022.01) |
| ***H04L 67/1087*** | (2022.01) |
| ***H04L 67/12*** | (2022.01) |

(52) U.S. Cl.

CPC .......... *G06F 9/4881* (2013.01); *G06F 9/5038* (2013.01); *G06F 9/505* (2013.01); *G06F 9/5072* (2013.01); *G06F 9/5077* (2013.01); *G06F 9/5083* (2013.01); *G06F 9/54* (2013.01); *G06F 11/0793* (2013.01); *G06F 12/0851* (2013.01); *G06F 12/0873* (2013.01); *H04L 63/0876* (2013.01); *H04L 63/12* (2013.01); *H04L 67/10* (2013.01); *H04L 67/1091* (2013.01); *H04L 67/12* (2013.01); *H04L 41/5003* (2013.01)

(56) References Cited

U.S. PATENT DOCUMENTS

| | | | |
|---|---|---|---|
| 7,861,246 | B2 | 12/2010 | Lu et al. |
| 9,363,087 | B2 | 6/2016 | Hawblitzel et al. |
| 9,811,380 | B1 | 11/2017 | Martin et al. |
| 9,906,493 | B1 | 2/2018 | Rodgers et al. |
| 10,044,696 | B2 | 8/2018 | Walker et al. |
| 10,389,800 | B2 | 8/2019 | Blainey et al. |
| 11,210,218 | B1 | 12/2021 | Tavallaei et al. |
| 11,288,096 | B2 | 3/2022 | Ugale et al. |
| 11,675,630 | B2 | 6/2023 | Behar et al. |
| 11,687,376 | B2 | 6/2023 | Cheng et al. |
| 11,924,060 | B2 | 3/2024 | Smith et al. |
| 2009/0279701 | A1 | 11/2009 | Moisand et al. |
| 2011/0213508 | A1 | 9/2011 | Mandagere et al. |
| 2011/0239220 | A1 | 9/2011 | Gibson et al. |
| 2013/0261826 | A1 | 10/2013 | Mandagere et al. |
| 2014/0143781 | A1 | 5/2014 | Yao |
| 2015/0081893 | A1 | 3/2015 | Chadwell et al. |
| 2015/0089507 | A1 | 3/2015 | Nagao |
| 2015/0200854 | A1 | 7/2015 | Buchnik et al. |
| 2015/0229582 | A1 | 8/2015 | Zhu et al. |
| 2015/0268985 | A1 | 9/2015 | Jokinen et al. |
| 2015/0350089 | A1 | 12/2015 | Wang et al. |
| 2016/0004571 | A1 | 1/2016 | Smith |
| 2016/0350157 | A1 | 12/2016 | Necas |
| 2016/0380819 | A1 | 12/2016 | Burger |
| 2017/0286122 | A1 | 10/2017 | Wu et al. |
| 2018/0285766 | A1 | 10/2018 | Shen et al. |
| 2018/0373863 | A1 | 12/2018 | Domke |
| 2019/0034716 | A1 | 1/2019 | Kamarol et al. |
| 2019/0043201 | A1 | 2/2019 | Strong et al. |
| 2019/0116128 | A1 | 4/2019 | Guo et al. |
| 2019/0319807 | A1 | 10/2019 | Fairfax et al. |
| 2019/0327328 | A1 | 10/2019 | Smith et al. |
| 2019/0370076 | A1 | 12/2019 | Behar et al. |
| 2019/0370084 | A1 | 12/2019 | Behar et al. |
| 2020/0065098 | A1 | 2/2020 | Parandeh Afshar et al. |
| 2020/0065290 | A1 | 2/2020 | Natu |
| 2020/0136906 | A1 | 4/2020 | Guim Bernat et al. |
| 2020/0250003 | A1 | 8/2020 | Yang et al. |
| 2020/0285523 | A1 | 9/2020 | Guim Bernat et al. |
| 2020/0372013 | A1 | 11/2020 | Lee et al. |
| 2020/0394045 | A1 | 12/2020 | Iwata |
| 2021/0011765 | A1 | 1/2021 | Doshi et al. |
| 2021/0097108 | A1 | 4/2021 | Goyal et al. |
| 2021/0109785 | A1 | 4/2021 | Prabhakaran et al. |
| 2021/0200592 | A1 | 7/2021 | Bernat et al. |
| 2022/0046670 | A1 | 2/2022 | Lin |
| 2022/0164242 | A1 | 5/2022 | Sui et al. |
| 2022/0206849 | A1 | 6/2022 | Guim Bernat et al. |
| 2022/0286481 | A1* | 9/2022 | Shaw ...................... H04L 63/20 |
| 2022/0400085 | A1 | 12/2022 | Ananthanarayanan et al. |
| 2023/0004433 | A1 | 1/2023 | Kan et al. |
| 2023/0133020 | A1 | 5/2023 | Sakalley et al. |
| 2023/0134683 | A1 | 5/2023 | Carranza et al. |
| 2023/0135645 | A1 | 5/2023 | Guim Bernat et al. |
| 2023/0135938 | A1 | 5/2023 | Carranza et al. |
| 2023/0136048 | A1 | 5/2023 | Doshi et al. |
| 2023/0136612 | A1 | 5/2023 | Doshi et al. |
| 2023/0136615 | A1 | 5/2023 | Guim Bernat et al. |
| 2023/0137879 | A1 | 5/2023 | Alam et al. |
| 2023/0140252 | A1 | 5/2023 | Carranza et al. |
| 2023/0199440 | A1 | 6/2023 | Lee et al. |
| 2023/0342478 | A1 | 10/2023 | Ranganathan et al. |
| 2023/0401099 | A1 | 12/2023 | Bruno et al. |
| 2023/0409233 | A1 | 12/2023 | Sheeley et al. |
| 2024/0020173 | A1 | 1/2024 | Chatterjee |
| 2024/0031221 | A1* | 1/2024 | Rajagopalan ........... H04L 41/12 |
| 2024/0112076 | A1 | 4/2024 | Jain et al. |
| 2024/0127392 | A1 | 4/2024 | Hughes et al. |

OTHER PUBLICATIONS

Kumar, Gautam, "Swift: Delay is Simple and Effective for Congestion Control in the Datacenter", SIGCOMM '20, (Aug. 2020), 15 pgs.

Mittal, Radhika, "Timely: RTT-Based Congestion Control For The Data Center", SIGCOMM, (Aug. 2015), 14 pgs.

"Elastics.cloud First to DemonstrateCXLtm Enabled Symmetric Multi HostMemory Pooling and Expansion", [Online]. Retrieved from the Internet https www.prnewswire.com news-releases elasticscloud-first-to-demonstrate-cxl-enabled-symmetric-multi-host-memory-pooling-and-expansion-301633093.html, Sep. 26, 2022, 3 pages.

"The GigaIO Fabrex Memory Fabric Memory Pooling Overview", [Online]. Retrieved from the Internet https gigaio.com project memory-pooling-overview , Feb. 2020, 8 pages.

"Marvell Announces Innovative CXL Development Platform for Multi-Host Memory Pooling", [Online]. Retrieved from the Internet https www.prnewswire.com news-releases marvell-announces-innovative-cxl-development-platform-for-multi-host-memory-pooling-301675043.html, Nov. 10, 2022, 3 pages.

"Intel Threading Building Blocks Tutorial v1.21", Intel Corporation, Oct. 27, 2011, 90 pages.

"U.S. Appl. No. 18/090,686, Non Final Office Action mailed Dec. 23, 2025", 8 pgs.

"U.S. Appl. No. 18/090,749, Non Final Office Action mailed Jan. 8, 2026", 11 pgs.

"U.S. Appl. No. 18/090,720, Non Final Office Action mailed Jan. 28, 2026", 13 pgs.

"U.S. Appl. No. 18/090,701, Non Final Office Action mailed Feb. 9, 2026", 9 pgs.

"U.S. Appl. No. 18/090,764, Non Final Office Action mailed Feb. 11, 2026", 15 pgs.

"U.S. Appl. No. 18/090,813, Non Final Office Action mailed Feb. 13, 2026", 17 pgs.

"U.S. Appl. No. 18/090,653, Non Final Office Action mailed Feb. 20, 2026", 25 pgs.

"U.S. Appl. No. 18/090,686, Response filed Mar. 4, 2026 to Non Final Office Action mailed Dec. 23, 2025", 9 pgs.

"U.S. Appl. No. 18/090,749, Response filed Apr. 7, 2026 to Non Final Office Action mailed Jan. 8, 2026", 13 pgs.

"U.S. Appl. No. 18/090,862, Notice of Allowance mailed Apr. 13, 2026", 11 pgs.

"U.S. Appl. No. 18/090,720, Response filed Apr. 16, 2026 to Non Final Office Action mailed Jan. 28, 2026", 12 pgs.

"U.S. Appl. No. 18/090,842, Non Final Office Action mailed Apr. 20, 2026", 17 pgs.

"U.S. Appl. No. 18/090,686, Notice of Allowance mailed Apr. 21, 2026", 6 pgs.

(56) References Cited

OTHER PUBLICATIONS

Ananthanarayanan, Ganesh, "Reining in the Outliers in Map Reduce Clusters using Mantri", 9th Usenix Symposium on Operating Systems Design and Implementation OSDI 10., 2010, 14 pages.
Moore, Andrew, "IPU-Based Cloud Infrastructure The Fulcrum For Digital Business", Intel Corporation, 2021, 6 pgs.
Nayyer, M. Z., "LBRO Load Balancing for Resource Optimization in Edge Computing", IEEE Access, vol. 10, pp. 97439-97449, doi 10.1109 Access.2022.3205741., 2022, 11 pgs.
"U.S. Appl. No. 18/090,813, Notice of Allowance mailed Jun. 9, 2026", 9 pgs.
"U.S. Appl. No. 18/090,720, Final Office Action mailed Jul. 1, 2026", 14 pgs.
"U.S. Appl. No. 18/090,842, Response filed Jul. 20, 2026 to Non Final Office Action mailed Apr. 20, 2026", 12 pgs.
"U.S. Appl. No. 18/090,701, Response filed Jul. 23, 2026 to Final Office Action mailed May 29, 2026", 13 pgs.
"U.S. Appl. No. 18/090,701, Advisory Action mailed Jul. 29, 2026", 3 pgs.
"U.S. Appl. No. 18/090,764, Response filed Jul. 29, 2026 to Final Office Action mailed Jun. 3, 2026", 11 pgs.
"U.S. Appl. No. 18/090,764, Advisory Action mailed Aug. 4, 2026", 2pgs.
"U.S. Appl. No. 18/090,686, Corrected Notice of Allowability mailed Aug. 7, 2026", 2pgs.

* cited by examiner

| Tiers | On-Premise Edge: Intelligent Sensor/GW (210) | | On-Premise Edge: Intelligent Edge (220) | | Network Edge (230) | | DC Edge (240) | | Core DC / Public Cloud (250, 260) | |
|---|---|---|---|---|---|---|---|---|---|---|
| Network Latencies (Wire Round Trip) | <1ms | | <1ms | | 1-5ms | | 5ms+1-2ms (every 100kms) | | 5ms+5 ms (every 400kms) | |
| Deployment Requirements | Compute Available Power: <50W Form Factor: Small Box Thermals: NEBs Mgmt.: Remote | | Compute Available Power: ~10KW Form Factor: Rack(s) Thermals: NEBS Or Standard DC Mgmt.: Remote | | Compute Available Power: <600W Form Factor: Pizza Box Thermals: NEBS Mgmt.: Remote | | Compute Available Power: 9KW/rack/1KW Sqm Form Factor: Rack(s) Thermals: NEBS or Standard DC Mgmt.: Remote | | Standard Data Center (DC) | |
| Where, What & Why | Use Case | KPI | Use Case | KPI | Use Case | KPI | Use Case | KPI | Use Case | KPI |
| | Intelligent Transportation | Data Privacy, Backhaul Traffic, Savings, Reliability | AR/VR | Latency. Backhaul Traffic Savings, Network Scalability | Intelligent Transportation | Data Privacy, Backhaul Traffic Savings, Reliability Throughput Latency | Intelligent Transportation | Data Privacy | CDN | Backhaul Traffic Savings, Throughput |
| | V2V | Latency | Retail | Data Privacy, Backhaul Traffic Savings, Reliability | V2V | Latency | Video Analytics | Same as Int. Transp. | Storage GW | Same as CDN |
| | Retail | Same As Int. Transp. | RT Streaming Healthcare | Same as AR/VR Access to Services | Video Analytics | Same as Int. Transp. | Drone/IoT | Same As Int. Transp. | | |
| | Video Analytics | Same as Int. Transp. | | | Drone/IoT | Same as Int. Transp. | Healthcare | Access to Services | | |
| | | | | | Rural | Access to Services | CDN & Storage | Backhaul Traffic Savings, Throughput | | |
| | | | | | | | Faas | Latency | | |
| | | | | | | | AR/VR/MR | Latency | | |

FIG. 3

INFRASTRUCTURE-DELEGATED ORCHESTRATION BACKUP USING NETWORKED PROCESSING UNITS

PRIORITY CLAIM

This application claims the benefit of priority to U.S. Provisional Patent Application No. 63/425,857, filed Nov. 16, 2022, and titled "COORDINATION OF DISTRIBUTED NETWORKED PROCESSING UNITS", which is incorporated herein by reference in its entirety.

TECHNICAL FIELD

Embodiments described herein generally relate to data processing, network communication, and communication system implementations of distributed computing, including the implementations with the use of networked processing units such as infrastructure processing units (IPUs) or data processing units (DPUs).

BACKGROUND

System architectures are moving to highly distributed multi-edge and multi-tenant deployments. Deployments may have different limitations in terms of power and space. Deployments also may use different types of compute, acceleration, and storage technologies in order to overcome these power and space limitations. Deployments also are typically interconnected in tiered and/or peer-to-peer fashion, in an attempt to create a network of connected devices and edge appliances that work together.

Edge computing, at a general level, has been described as systems that provide the transition of compute and storage resources closer to endpoint devices at the edge of a network (e.g., consumer computing devices, user equipment, etc.). As compute and storage resources are moved closer to endpoint devices, a variety of advantages have been promised such as reduced application latency, improved service capabilities, improved compliance with security or data privacy requirements, improved backhaul bandwidth, improved energy consumption, and reduced cost. However, many deployments of edge computing technologies—especially complex deployments for use by multiple tenants—have not been fully adopted.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 depicts additional characteristics of respective deployments tiers in a distributed edge computing environment, according to an example;

DETAILED DESCRIPTION

The following discusses approaches for coordinating edge computing orchestration service backup in case of failure or service interruption to an active orchestration service. In an example, each of the orchestrators in a particular failure zone is associated with one or multiple "shadow" instances. Then, when a failure occurs, the role of a "primary" orchestrator (i.e., the previously-active orchestrator that has failed) can be transitioned into the secondary "shadow" instance (i.e., a standby entity available to act as orchestrator) to assume the role of the primary orchestrator. As provided in the following examples, such orchestration monitoring, coordination, and failover can be accomplished through the use of networked processing units such as infrastructure processing units (IPUs).

For instance, an IPU arrangement can coordinate a number of IPUs in a failure zone, including to reach an agreement that a particular IPU is responsible to introduce remedial actions when there is a controlling orchestrator service failure. The IPUs also may coordinate and maintain a list of failover actions and services to monitor and to contact when acting as a failover mechanism. For instance, an IPU that has transitioned into a role as a new primary orchestrator can monitor when the original orchestrator becomes active again, and if necessary, migrate roles so that the original orchestrator resumes its role as the primary orchestrator. IPUs may also synchronize information about the status of the orchestration, and provide information to entities to launch a fast failover shadow. IPUs may also coordinate operations at a variety of computing nodes, in addition to orchestration operations, with the objective of enabling low latency failover/shadowing. These and other orchestration coordination and servicing operations are discussed in more details in the sections below.

Figure 1:
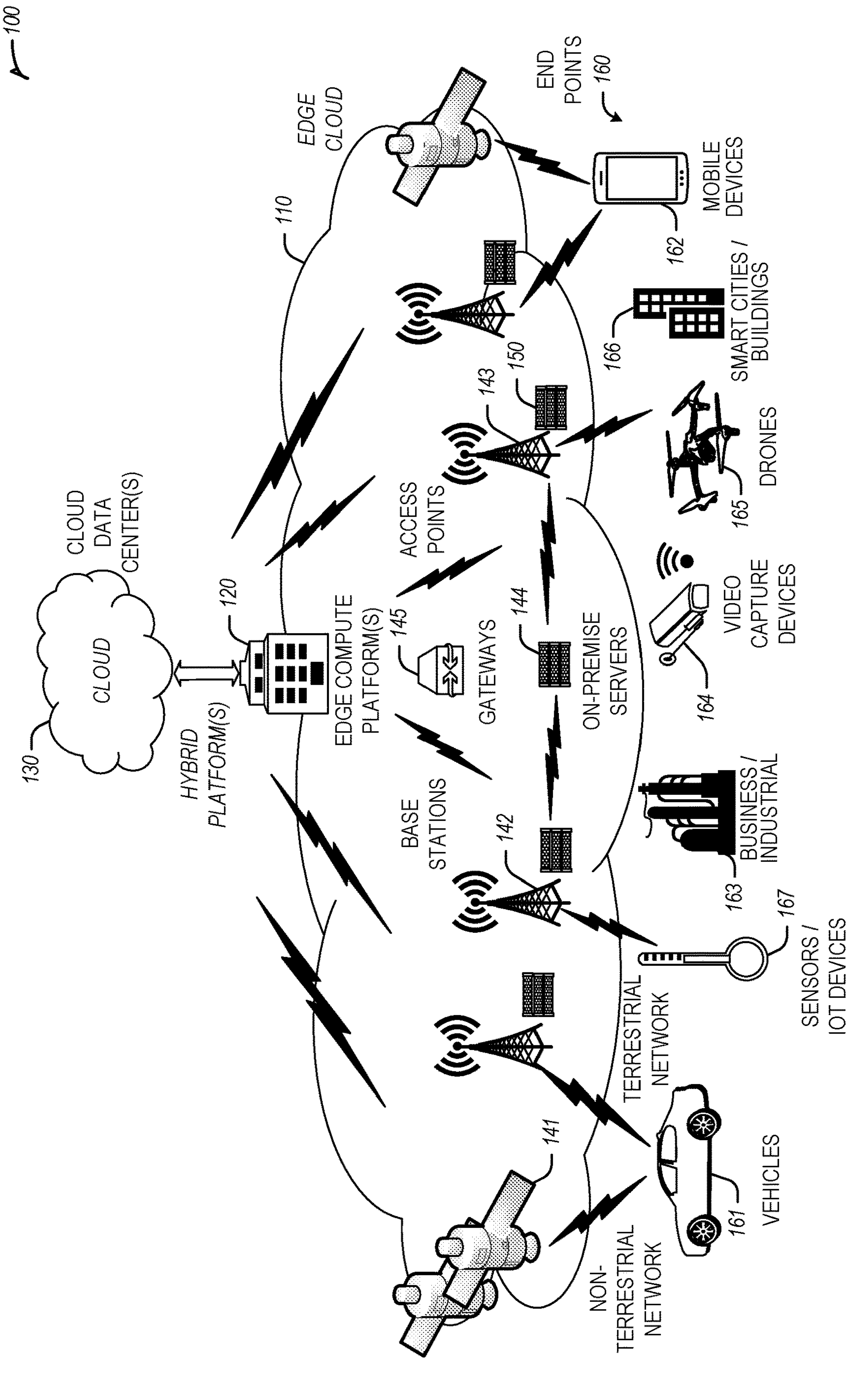
FIG. 1 illustrates an overview of a distributed edge computing environment, according to an example.

FIG. 1 is a block diagram 100 showing an overview of a distributed edge computing environment, which may be adapted for implementing the present techniques for distributed networked processing units. As shown, the edge cloud 110 is established from processing operations among one or more edge locations, such as a satellite vehicle 141, a base station 142, a network access point 143, an on premise server 144, a network gateway 145, or similar networked devices and equipment instances. These processing operations may be coordinated by one or more edge computing platforms 120 or systems that operate networked processing units (e.g., IPUs, DPUs) as discussed herein.

The edge cloud 110 is generally defined as involving compute that is located closer to endpoints 160 (e.g., consumer and producer data sources) than the cloud 130, such as autonomous vehicles 161, user equipment 162, business and industrial equipment 163, video capture devices 164, drones 165, smart cities and building devices 166, sensors and IoT devices 167, etc. Compute, memory, network, and storage resources that are offered at the entities in the edge cloud 110 can provide ultra-low or improved latency response times for services and functions used by the endpoint data sources as well as reduce network backhaul traffic from the edge cloud 110 toward cloud 130 thus improving energy consumption and overall network usages among other benefits.

Compute, memory, and storage are scarce resources, and generally decrease depending on the edge location (e.g., fewer processing resources being available at consumer end point devices than at a base station or a central office data center). As a general design principle, edge computing attempts to minimize the number of resources needed for network services, through the distribution of more resources that are located closer both geographically and in terms of in-network access time.

Figure 2:
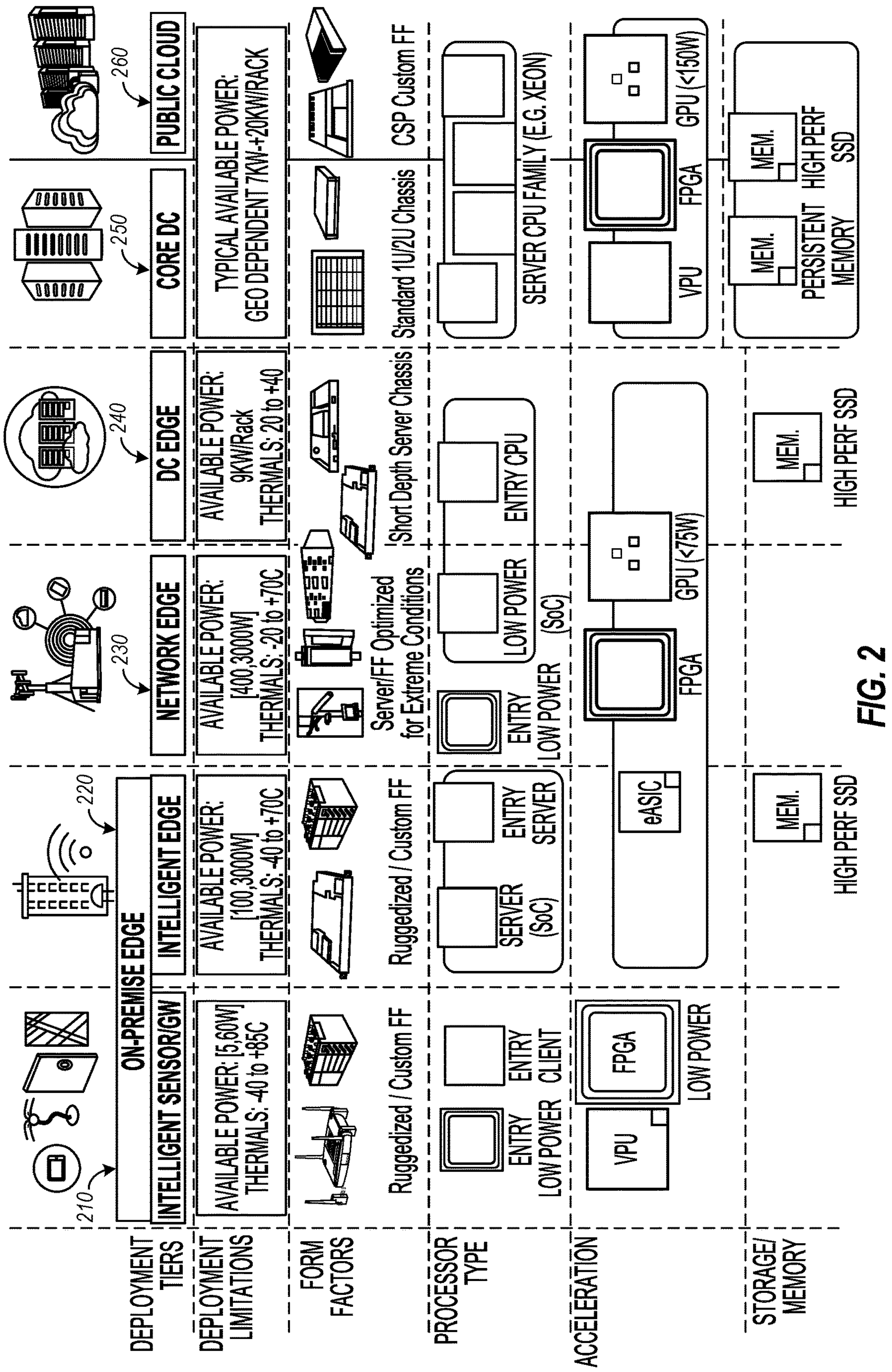
FIG. 2 depicts computing hardware provided among respective deployment tiers in a distributed edge computing environment, according to an example.

FIG. 2 depicts examples of computing hardware provided among respective deployment tiers in a distributed edge computing environment. Here, one tier at an on-premise edge system is an intelligent sensor or gateway tier 210, which operates network devices with low power and entry-level processors and low-power accelerators. Another tier at an on-premise edge system is an intelligent edge tier 220, which operates edge nodes with higher power limitations and may include a high-performance storage.

Further in the network, a network edge tier 230 operates servers including form factors optimized for extreme conditions (e.g., outdoors). A data center edge tier 240 operates additional types of edge nodes such as servers, and includes increasingly powerful or capable hardware and storage technologies. Still further in the network, a core data center tier 250 and a public cloud tier 260 operate compute equipment with the highest power consumption and largest configuration of processors, acceleration, storage/memory devices, and highest throughput network.

In each of these tiers, various forms of Intel® processor lines are depicted for purposes of illustration; it will be understood that other brands and manufacturers of hardware will be used in real-world deployments. Additionally, it will be understood that additional features or functions may exist among multiple tiers. One such example is connectivity and infrastructure management that enable a distributed IPU architecture, that can potentially extend across all of tiers 210, 220, 230, 240, 250, 260. Other relevant functions that may extend across multiple tiers may relate to security features, domain or group functions, and the like.

FIG. 3 depicts additional characteristics of respective deployment tiers in a distributed edge computing environment, based on the tiers discussed with reference to FIG. 2. This figure depicts additional network latencies at each of the tiers 210, 220, 230, 240, 250, 260, and the gradual increase in latency in the network as the compute is located at a longer distance from the edge endpoints. Additionally, this figure depicts additional power and form factor constraints, use cases, and key performance indicators (KPIs).

With these variations and service features in mind, edge computing within the edge cloud 110 may provide the ability to serve and respond to multiple applications of the use cases in real-time or near real-time and meet ultra-low latency requirements. As systems have become highly-distributed, networking has become one of the fundamental pieces of the architecture that allow achieving scale with resiliency, security, and reliability. Networking technologies have evolved to provide more capabilities beyond pure network routing capabilities, including to coordinate quality of service, security, multi-tenancy, and the like. This has also been accelerated by the development of new smart network adapter cards and other type of network derivatives that incorporated capabilities such as ASICs (application-specific integrated circuits) or FPGAs (field programmable gate arrays) to accelerate some of those functionalities (e.g., remote attestation).

In these contexts, networked processing units have begun to be deployed at network cards (e.g., smart NICs), gateways, and the like, which allow direct processing of network workloads and operations. One example of a networked processing unit is an infrastructure processing unit (IPU), which is a programmable network device that can be extended to provide compute capabilities with far richer functionalities beyond pure networking functions. Another example of a network processing unit is a data processing unit (DPU), which offers programmable hardware for performing infrastructure and network processing operations. The following discussion refers to functionality applicable to an IPU configuration, such as that provided by an Intel® line of IPU processors. However, it will be understood that functionality will be equally applicable to DPUs and other types of networked processing units provided by ARM®, Nvidia®, and other hardware OEMs.

Figure 4:
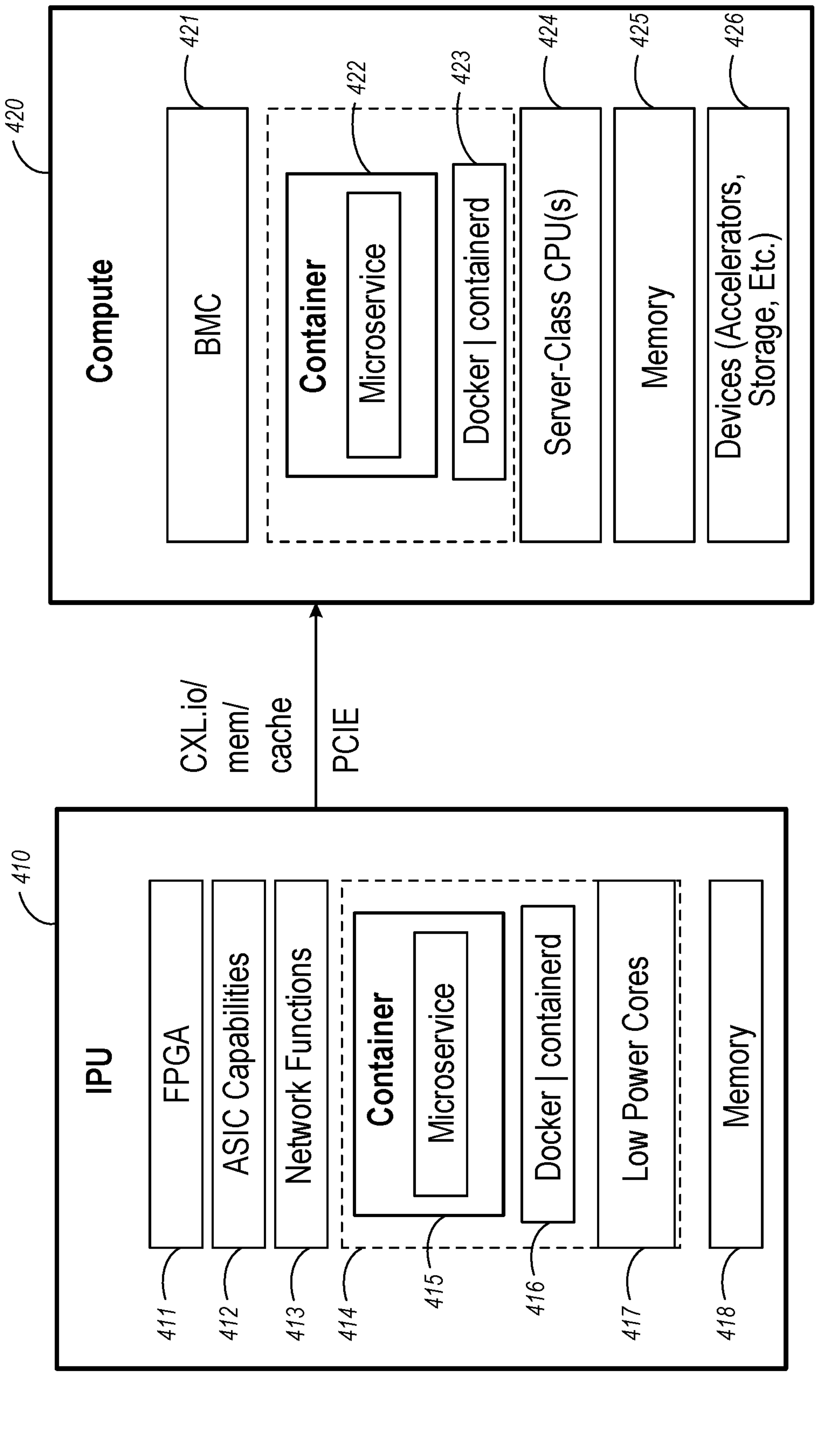
FIG. 4 depicts a computing system architecture including a compute platform and a network processing platform provided by an infrastructure processing unit, according to an example.

FIG. 4 depicts an example compute system architecture that includes a compute platform 420 and a network processing platform comprising an IPU 410. This architecture—and in particular the IPU 410—can be managed, coordinated, and orchestrated by the functionality discussed below, including with the functions described with reference to FIG. 6.

The main compute platform 420 is composed by typical elements that are included with a computing node, such as one or more CPUs 424 that may or may not be connected via a coherent domain (e.g., via Ultra Path Interconnect (UPI) or another processor interconnect); one or more memory units 425; one or more additional discrete devices 426 such as storage devices, discrete acceleration cards (e.g., a field-programmable gate array (FPGA), a visual processing unit (VPU), etc.); a baseboard management controller 421; and the like. The compute platform 420 may operate one or more containers 422 (e.g., with one or more microservices), within a container runtime 423 (e.g., Docker containerd). The IPU 410 operates as a networking interface and is connected to the compute platform 420 using an interconnect (e.g., using either PCIe or CXL). The IPU 410, in this context, can be observed as another small compute device that has its own: (1) Processing cores (e.g., provided by low-power cores 417), (2) operating system (OS) and cloud native platform 414 to operate one or more containers 415 and a container runtime 416; (3) Acceleration functions provided by an ASIC 411 or FPGA 412; (4) Memory 418; (5) Network functions provided by network circuitry 413; etc.

From a system design perspective, this arrangement provides important functionality. The IPU 410 is seen as a discrete device from the local host (e.g., the OS running in the compute platform CPUs 424) that is available to provide certain functionalities (networking, acceleration etc.). Those functionalities are typically provided via Physical or Virtual PCIe functions. Additionally, the IPU 410 is seen as a host (with its own IP etc.) that can be accessed by the infrastructure to setup an OS, run services, and the like. The IPU 410 sees all the traffic going to the compute platform 420 and can perform actions—such as intercepting the data or performing some transformation—as long as the correct security credentials are hosted to decrypt the traffic. Traffic going through the IPU goes to all the layers of the Open Systems Interconnection model (OSI model) stack (e.g., from physical to application layer). Depending on the features that the IPU has, processing may be performed at the transport layer only. However, if the IPU has capabilities to perform traffic intercept, then the IPU also may be able to intercept traffic at the traffic layer (e.g., intercept CDN traffic and process it locally).

Some of the use cases being proposed for IPUs and similar networked processing units include: to accelerate network processing; to manage hosts (e.g., in a data center); or to implement quality of service policies. However, most of functionalities today are focused at using the IPU at the local appliance level and within a single system. These approaches do not address how the IPUs could work together in a distributed fashion or how system functionalities can be divided among the IPUs on other parts of the system. Accordingly, the following introduces enhanced approaches for enabling and controlling distributed functionality among multiple networked processing units. This enables the extension of current IPU functionalities to work as a distributed set of IPUs that can work together to achieve stronger features such as, resiliency, reliability, etc.

Distributed Architectures of IPUs

Figure 5:
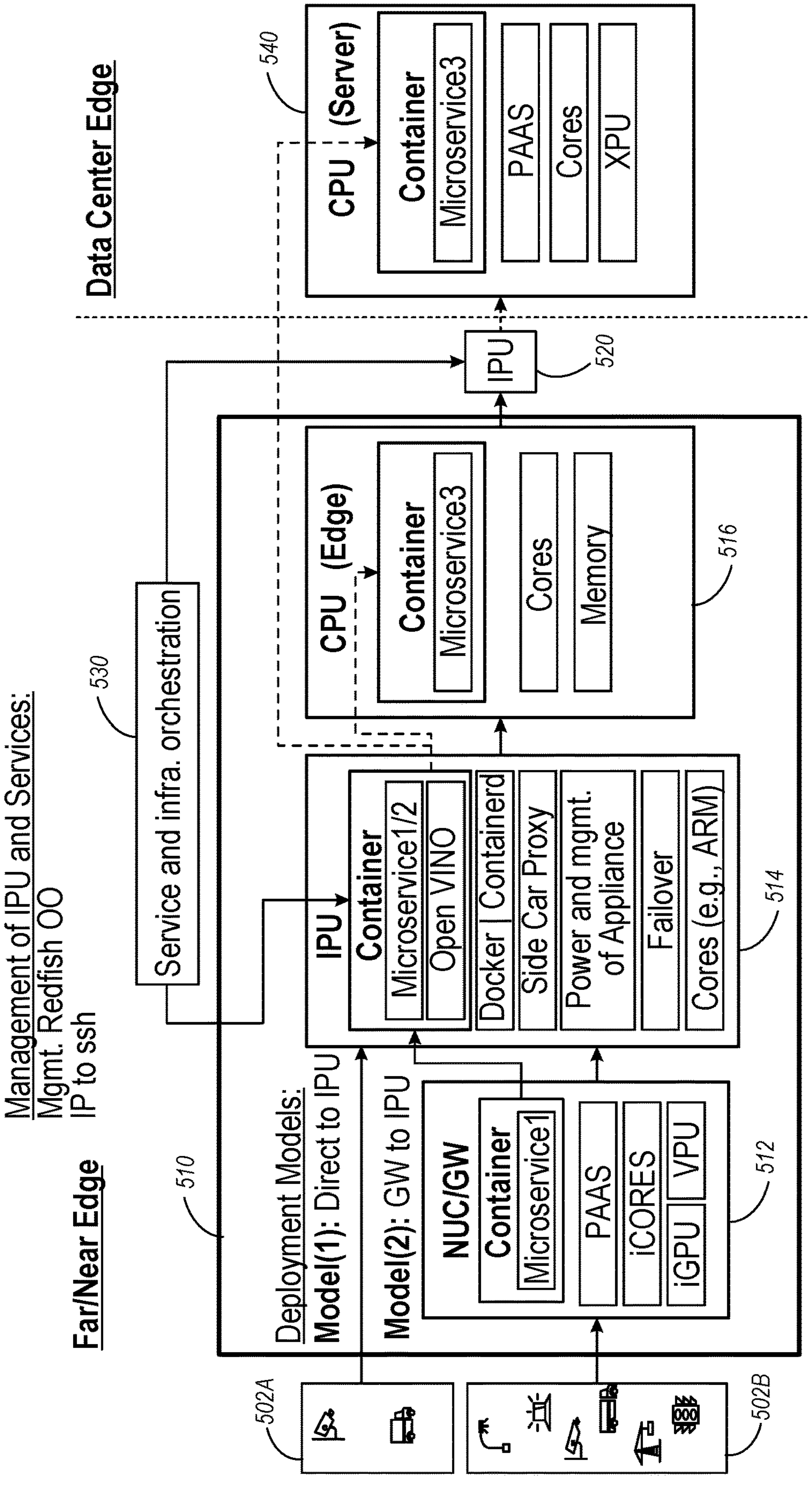
FIG. 5 depicts an infrastructure processing unit arrangement operating as a distributed network processing platform within network and data center edge settings, according to an example.

FIG. 5 depicts an IPU arrangement operating as a distributed network processing platform within network and data center edge settings. In a first deployment model of a computing environment 510, workloads or processing requests are directly provided to an IPU platform, such as directly to IPU 514. In a second deployment model of the computing environment 510, workloads or processing requests are provided to some intermediate processing device 512, such as a gateway or NUC (next unit of computing) device form factor, and the intermediate processing device 512 forwards the workloads or processing requests to the IPU 514. It will be understood that a variety of other deployment models involving the composability and coordination of one or more IPUs, compute units, network devices, and other hardware may be provided.

With the first deployment model, the IPU 514 directly receives data from use cases 502A. The IPU 514 operates one or more containers with microservices to perform processing of the data. As an example, a small gateway (e.g., a NUC type of appliance) may connect multiple cameras to an edge system that is managed or connected by the IPU 514. The IPU 514 may process data as a small aggregator of sensors that runs on the far edge, or may perform some level of inline or preprocessing and that sends payload to be further processed by the IPU or the system that the IPU connects.

With the second deployment model, the intermediate processing device 512 provided by the gateway or NUC receives data from use cases 502B. The intermediate processing device 512 includes various processing elements (e.g., CPU cores, GPUs), and may operate one or more microservices for servicing workloads from the use cases 502B. However, the intermediate processing device 512 invokes the IPU 514 to complete processing of the data.

In either the first or the second deployment model, the IPU 514 may connect with a local compute platform, such as that provided by a CPU 516 (e.g., Intel® Xeon CPU) operating multiple microservices. The IPU may also connect with a remote compute platform, such as that provided at a data center by CPU 540 at a remote server. As an example, consider a microservice that performs some analytical processing (e.g., face detection on image data), where the CPU 516 and the CPU 540 provide access to this same microservice. The IPU 514, depending on the current load of the CPU 516 and the CPU 540, may decide to forward the images or payload to one of the two CPUs. Data forwarding or processing can also depend on other factors such as SLA for latency or performance metrics (e.g., perf/watt) in the two systems. As a result, the distributed IPU architecture may accomplish features of load balancing.

The IPU in the computing environment 510 may be coordinated with other network-connected IPUs. In an example, a Service and Infrastructure orchestration manager 530 may use multiple IPUs as a mechanism to implement advanced service processing schemes for the user stacks. This may also enable implementing of system functionalities such as failover, load balancing etc.

In a distributed architecture example, IPUs can be arranged in the following non-limiting configurations. As a first configuration, a particular IPU (e.g., IPU 514) can work with other IPUs (e.g., IPU 520) to implement failover mechanisms. For example, an IPU can be configured to forward traffic to service replicas that runs on other systems when a local host does not respond.

As a second configuration, a particular IPU (e.g., IPU 514) can work with other IPUs (e.g., IPU 520) to perform load balancing across other systems. For example, consider a scenario where CDN traffic targeted to the local host is forwarded to another host in case that I/O or compute in the local host is scarce at a given moment.

As a third configuration, a particular IPU (e.g., IPU 514) can work as a power management entity to implement advanced system policies. For example, consider a scenario where the whole system (e.g., including CPU 516) is placed in a C6 state (a low-power/power-down state available to a processor) while forwarding traffic to other systems (e.g., IPU 520) and consolidating it.

As will be understood, fully coordinating a distributed IPU architecture requires numerous aspects of coordination and orchestration. The following examples of system architecture deployments provide discussion of how edge computing systems may be adapted to include coordinated IPUs, and how such deployments can be orchestrated to use IPUs at multiple locations to expand to the new envisioned functionality.

Distributed IPU Functionality

Figure 6:
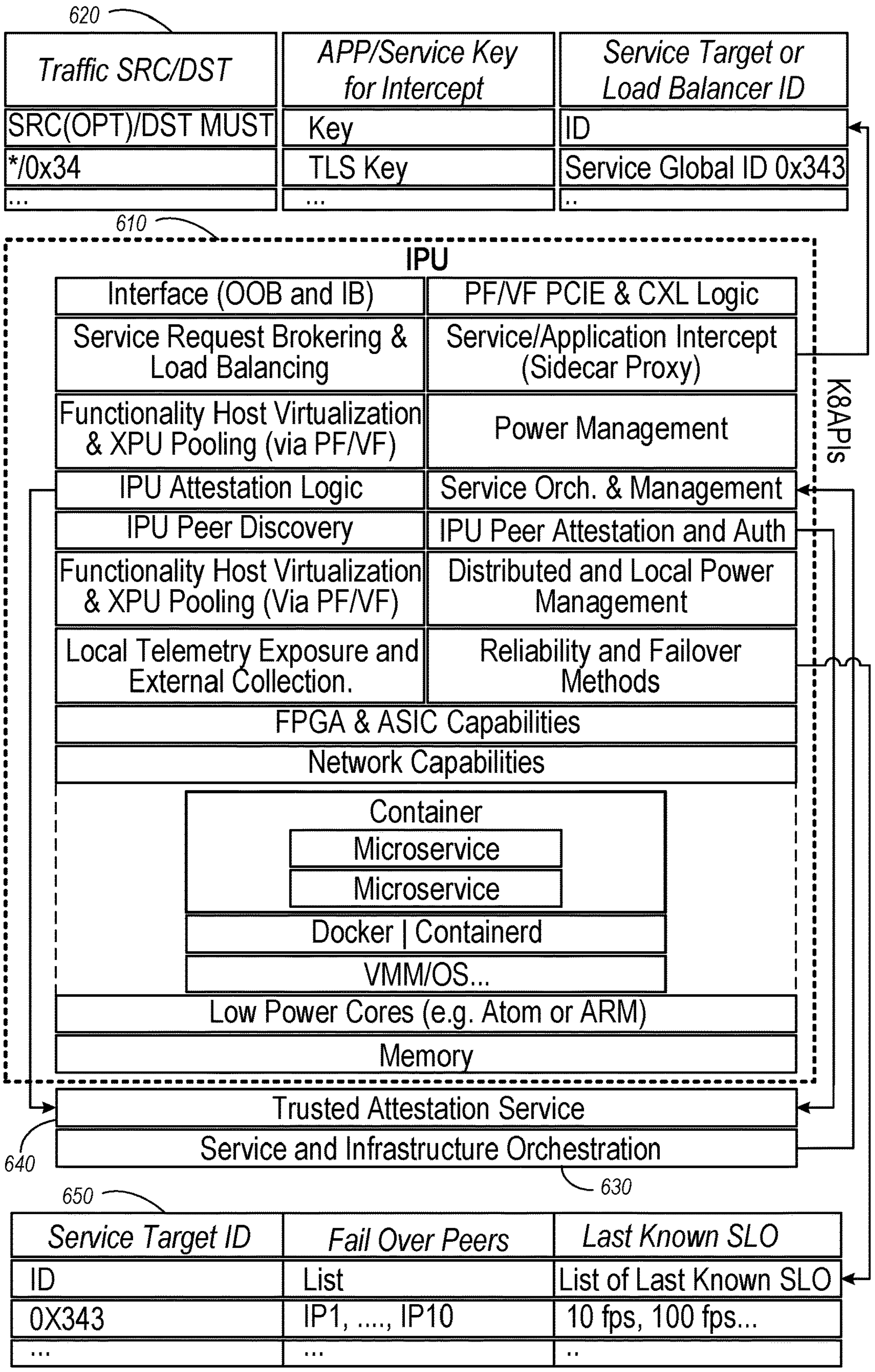
FIG. 6 depicts functional components of an infrastructure processing unit and related services, according to an example.

An arrangement of distributed IPUs offers a set of new functionalities to enable IPUs to be service focused. FIG. 6 depicts functional components of an IPU 610, including services and features to implement the distributed functionality discussed herein. It will be understood that some or all of the functional components provided in FIG. 6 may be distributed among multiple IPUs, hardware components, or platforms, depending on the particular configuration and use case involved.

In the block diagram of FIG. 6, a number of functional components are operated to manage requests for a service running in the IPU (or running in the local host). As discussed above, IPUs can either run services or intercept requests arriving to services running in the local host and perform some action. In the latter case, the IPU can perform the following types of actions/functions (provided as a non-limiting examples).

Peer Discovery. In an example, each IPU is provided with Peer Discovery logic to discover other IPUs in the distributed system that can work together with it. Peer Discovery logic may use mechanisms such as broadcasting to discover other IPUs that are available on a network. The Peer Discovery logic is also responsible to work with the Peer Attestation and Authentication logic to validate and authenticate the peer IPU's identity, determine whether they are trustworthy, and whether the current system tenant allows the current IPU to work with them. To accomplish this, an IPU may perform operations such as: retrieve a proof of identity and proof of attestation; connect to a trusted service running in a trusted server; or, validate that the discovered system is trustworthy. Various technologies (including hardware components or standardized software implementations) that enable attestation, authentication, and security may be used with such operations.

Peer Attestation. In an example, each IPU provides interfaces to other IPUs to enable attestation of the IPU itself. IPU Attestation logic is used to perform an attestation flow within a local IPU in order to create the proof of identity that will be shared with other IPUs. Attestation here may integrate previous approaches and technologies to attest a compute platform. This may also involve the use of trusted attestation service 640 to perform the attestation operations.

Functionality Discovery. In an example, a particular IPU includes capabilities to discover the functionalities that peer IPUs provide. Once the authentication is done, the IPU can determine what functionalities that the peer IPUs provide (using the IPU Peer Discovery Logic) and store a record of such functionality locally. Examples of properties to discover can include: (i) Type of IPU and functionalities provided and associated KPIs (e.g. performance/watt, cost etc.); (ii) Available functionalities as well as possible functionalities to execute under secure enclaves (e.g., enclaves provided by Intel® SGX or TDX technologies); (iii) Current services that are running on the IPU and on the system that can potentially accept requests forwarded from this IPU; or (iv) Other interfaces or hooks that are provided by an IPU, such as: Access to remote storage; Access to a remote VPU; Access to certain functions. In a specific example, service may be described by properties such as: UUID; Estimated performance KPIs in the host or IPU; Average performance provided by the system during the N units of time (or any other type of indicator); and like properties.

Service Management. The IPU includes functionality to manage services that are running either on the host compute platform or in the IPU itself. Managing (orchestration) services includes performance service and resource orchestration for the services that can run on the IPU or that the IPU can affect. Two type of usage models are envisioned:

External Orchestration Coordination. The IPU may enable external orchestrators to deploy services on the IPU compute capabilities. To do so, an IPU includes a component similar to K8 compatible APIs to manage the containers (services) that run on the IPU itself. For example, the IPU may run a service that is just providing content to storage connected to the platform. In this case, the orchestration entity running in the IPU may manage the services running in the IPU as it happens in other systems (e.g. keeping the service level objectives).

Further, external orchestrators can be allowed to register to the IPU that services are running on the host may require to broker requests, implement failover mechanisms and other functionalities. For example, an external orchestrator may register that a particular service running on the local compute platform is replicated in another edge node managed by another IPU where requests can be forwarded.

In this later use case external orchestrators may provide to the Service/Application Intercept logic the inputs that are needed to intercept traffic for these services (as typically is encrypted). This may include properties such as a source and destination traffic of the traffic to be intercepted, or the key to use to decrypt the traffic. Likewise, this may be needed to terminate TLS to understand the requests that arrive to the IPU and that the other logics may need to parse to take actions. For example, if there is a CDN read request the IPU may need to decrypt the packet to understand that network packet includes a read request and may redirect it to another host based on the content that is being intercepted. Examples of Service/Application Intercept information is depicted in table 620 in FIG. 6.

External Orchestration Implementation. External orchestration can be implemented in multiple topologies. One supported topology includes having the orchestrator managing all the IPUs running on the backend public or private cloud. Another supported topology includes having the orchestrator managing all the IPUs running in a centralized edge appliance. Still another supported topology includes having the orchestrator running in another IPU that is working as the controller or having the orchestrator running distributed in multiple other IPUs that are working as controllers (master/primary node), or in a hierarchical arrangement.

Functionality for Broker requests. The IPU may include Service Request Brokering logic and Load Balancing logic to perform brokering actions on arrival for requests of target services running in the local system. For instance, the IPU may decide to see if those requests can be executed by other peer systems (e.g., accessible through Service and Infrastructure Orchestration 630). This can be caused, for example, because load in the local systems is high. The local IPU may negotiate with other peer IPUs for the possibility to forward the request. Negotiation may involve metrics such as cost. Based on such negotiation metrics, the IPU may decide to forward the request.

Functionality for Load Balancing requests. The Service Request Brokering and Load Balancing logic may distribute requests arriving to the local IPU to other peer IPUs. In this case, the other IPUs and the local IPU work together and do not necessarily need brokering. Such logic acts similar to a cloud native sidecar proxy. For instance, requests arriving to the system may be sent to the service X running in the local system (either IPU or compute platform) or forwarded to a peer IPU that has another instance of service X running. The load balancing distribution can be based on existing algorithms such as based on the systems that have lower load, using round robin, etc.

Functionality for failover, resiliency and reliability. The IPU includes Reliability and Failover logic to monitor the status of the services running on the compute platform or the status of the compute platform itself. The Reliability and Failover logic may require the Load Balancing logic to transiently or permanently forward requests that aim specific services in situations such as where: i) The compute platform is not responding; ii) The service running inside the compute node is not responding; and iii) The compute platform load prevents the targeted service to provide the right level of service level objectives (SLOs). Note that the logic must know the required SLOs for the services. Such functionality may be coordinated with service information 650 including SLO information.

Functionality for executing parts of the workloads. Use cases such as video analytics tend to be decomposed in different microservices that conform a pipeline of actions that can be used together. The IPU may include a workload pipeline execution logic that understands how workloads are composed and manage their execution. Workloads can be defined as a graph that connects different microservices. The load balancing and brokering logic may be able to understand those graphs and decide what parts of the pipeline are executed where. Further, to perform these and other operations, Intercept logic will also decode what requests are included as part of the requests.

Resource Management

A distributed network processing configuration may enable IPUs to perform important role for managing resources of edge appliances. As further shown in FIG. 6, the functional components of an IPU can operate to perform these and similar types of resource management functionalities.

As a first example, an IPU can provide management or access to external resources that are hosted in other locations and expose them as local resources using constructs such as Compute Express Link (CXL). For example, the IPU could potentially provide access to a remote accelerator that is hosted in a remote system via CXL.mem/cache and IO. Another example includes providing access to remote storage device hosted in another system. In this later case the local IPU could work with another IPU in the storage system and expose the remote system as PCIE VF/PF (virtual functions/physical functions) to the local host.

As a second example, an IPU can provide access to IPU-specific resources. Those IPU resource may be physical (such as storage or memory) or virtual (such as a service that provides access to random number generation).

As a third example, an IPU can manage local resources that are hosted in the system where it belongs. For example, the IPU can manage power of the local compute platform.

As a fourth example, an IPU can provide access to other type of elements that relate to resources (such as telemetry or other types of data). In particular, telemetry provides useful data for something that is needed to decide where to execute things or to identify problems.

I/O Management. Because the IPU is acting as a connection proxy between the external peers (compute systems, remote storage etc.) resources and the local compute, the IPU can also include functionality to manage I/O from the system perspective.

Host Virtualization and XPU Pooling. The IPU includes Host Virtualization and XPU Pooling logic responsible to manage the access to resources that are outside the system domain (or within the IPU) and that can be offered to the local compute system. Here, "XPU" refers to any type of a processing unit, whether CPU, GPU, VPU, an acceleration processing unit, etc. The IPU logic, after discovery and attestation, can agree with other systems to share external resources with the services running in the local system. IPUs may advertise to other peers available resources or can be discovered during discovery phase as introduced earlier. IPUs may request to other IPUS to those resources. For example, an IPU on system A may request access to storage on system B manage by another IPU. Remote and local IPUs can work together to establish a connection between the target resources and the local system.

Once the connection and resource mapping is completed, resources can be exposed to the services running in the local compute node using the VF/PF PCIE and CXL Logic. Each of those resources can be offered as VF/PF. The IPU logic can expose to the local host resources that are hosted in the IPU. Examples of resources to expose may include local accelerators, access to services, and the like.

Power Management. Power management is one of the key features to achieve favorable system operational expenditures (OPEXs). IPU is very well positioned to optimize power consumption that the local system is consuming. The distributed and local power management unit is responsible to meter the power that the system is consuming, the load that the system is receiving and track the service level agreements that the various services running in the system are achieving for the arriving requests. Likewise, when power efficiencies (e.g., power usage effectiveness (PUE)) are not achieving certain thresholds or the local compute demand is low, the IPU may decide to forward the requests to local services to other IPUs that host replicas of the services. Such power management features may also coordinate with the Brokering and Load Balancing logic discussed above. As will be understood, IPUs can work together to decide where requests can be consolidated to establish higher power efficiency as system. When traffic is redirected, the local power consumption can be reduced in different ways. Example operations that can be performed include: changing the system to C6 State; changing the base frequencies; performing other adaptations of the system or system components.

Telemetry Metrics. The IPU can generate multiple types of metrics that can be interesting from services, orchestration or tenants owning the system. In various examples, telemetry can be accessed, including: (i) Out of band via side interfaces; (ii) In band by services running in the IPU; or (iii) Out of band using PCIE or CXL from the host perspective. Relevant types of telemetries can include: Platform telemetry; Service Telemetry; IPU telemetry; Traffic telemetry; and the like.

System Configurations for Distributed Processing

Further to the examples noted above, the following configurations may be used for processing with distributed IPUs:

1) Local IPUs connected to a compute platform by an interconnect (e.g., as shown in the configuration of FIG. 4);

2) Shared IPUs hosted within a rack/physical network—such as in a virtual slice or multi-tenant implementation of IPUs connected via CXL/PCI-E (local), or extension via Ethernet/Fiber for nodes within a cluster;

3) Remote IPUs accessed via an IP Network, such as within certain latency for data plane offload/storage offloads (or, connected for management/control plane operations); or 4) Distributed IPUs providing an interconnected network of IPUs, including as many as hundreds of nodes within a domain.

Configurations of distributed IPUs working together may also include fragmented distributed IPUs, where each IPU or pooled system provides part of the functionalities, and each IPU becomes a malleable system. Configurations of distributed IPUs may also include virtualized IPUs, such as provided by a gateway, switch, or an inline component (e.g., inline between the service acting as IPU), and in some examples, in scenarios where the system has no IPU.

Other deployment models for IPUs may include IPU-to-IPU in the same tier or a close tier; IPU-to-IPU in the cloud (data to compute versus compute to data); integration in small device form factors (e.g., gateway IPUs); gateway/

NUC+IPU which connects to a data center; multiple GW/NUC (e.g. 16) which connect to one IPU (e.g. switch); gateway/NUC+IPU on the server; and GW/NUC and IPU that are connected to a server with an IPU.

The preceding distributed IPU functionality may be implemented among a variety of types of computing architectures, including one or more gateway nodes, one or more aggregation nodes, or edge or core data centers distributed across layers of the network (e.g., in the arrangements depicted in FIGS. 2 and 3). Accordingly, such IPU arrangements may be implemented in an edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives. Such edge computing systems may be embodied as a type of device, appliance, computer, or other "thing" capable of communicating with other edge, networking, or endpoint components.

Figure 7:
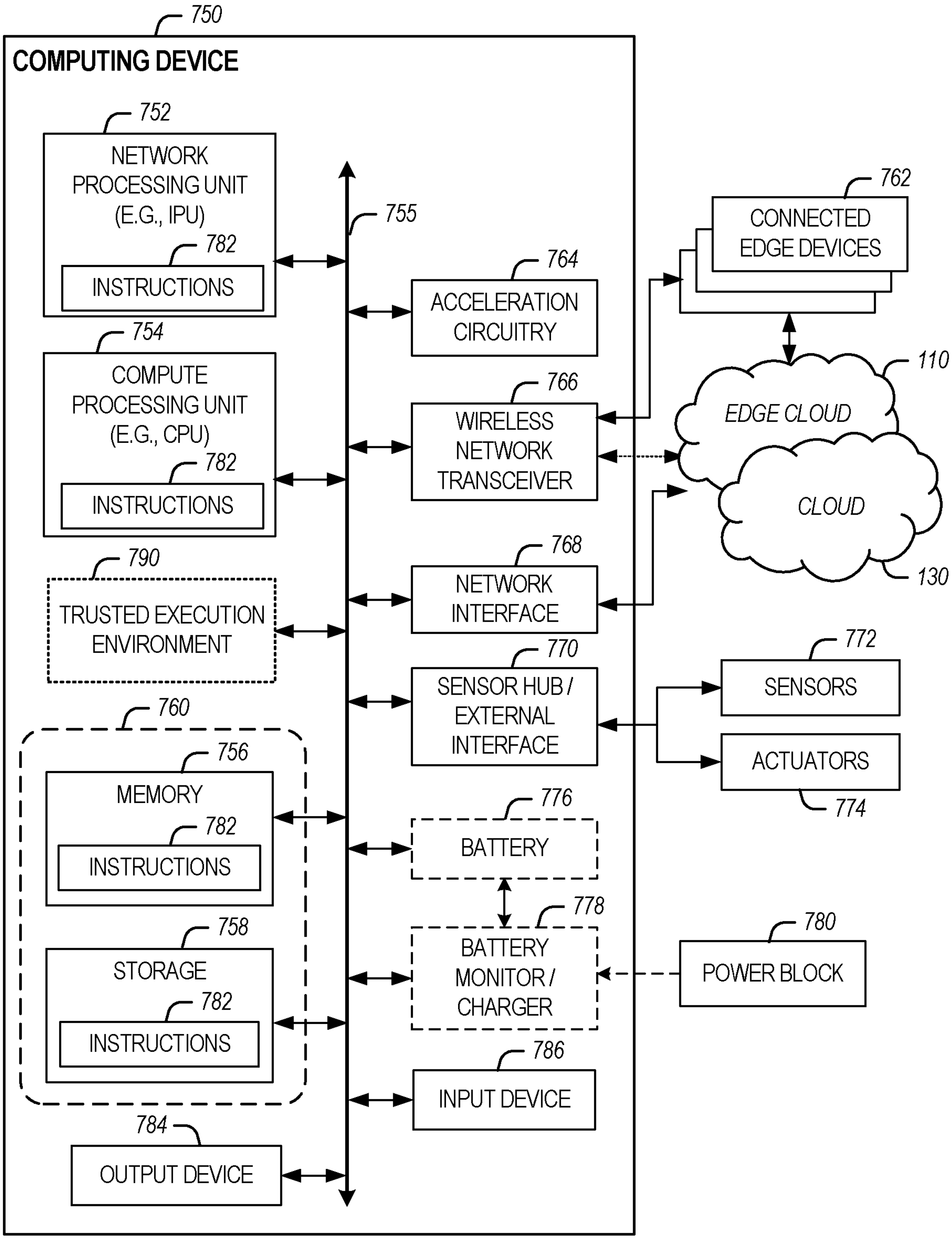
FIG. 7 depicts a block diagram of example components in an edge computing system which implements a distributed network processing platform, according to an example.

FIG. 7 depicts a block diagram of example components in a computing device 750 which can operate as a distributed network processing platform. The computing device 750 may include any combinations of the components referenced above, implemented as integrated circuits (ICs), as a package or system-on-chip (SoC), or as portions thereof, discrete electronic devices, or other modules, logic, instruction sets, programmable logic or algorithms, hardware, hardware accelerators, software, firmware, or a combination thereof adapted in the computing device 750, or as components otherwise incorporated within a larger system. Specifically, the computing device 750 may include processing circuitry comprising one or both of a network processing unit 752 (e.g., an IPU or DPU, as discussed above) and a compute processing unit 754 (e.g., a CPU).

The network processing unit 752 may provide a networked specialized processing unit such as an IPU, DPU, network processor, or other "xPU" outside of the central processing unit (CPU). The processing unit may be embodied as a standalone circuit or circuit package, integrated within an SoC, integrated with networking circuitry (e.g., in a SmartNIC), or integrated with acceleration circuitry, storage devices, or AI or specialized hardware, consistent with the examples above.

The compute processing unit 754 may provide a processor as a central processing unit (CPU) microprocessor, multi-core processor, multithreaded processor, an ultra-low voltage processor, an embedded processor, or other forms of a special purpose processing unit or specialized processing unit for compute operations.

Either the network processing unit 752 or the compute processing unit 754 may be a part of a system on a chip (SoC) which includes components formed into a single integrated circuit or a single package. The network processing unit 752 or the compute processing unit 754 and accompanying circuitry may be provided in a single socket form factor, multiple socket form factor, or a variety of other formats.

The processing units 752, 754 may communicate with a system memory 756 (e.g., random access memory (RAM)) over an interconnect 755 (e.g., a bus). In an example, the system memory 756 may be embodied as volatile (e.g., dynamic random access memory (DRAM), etc.) memory. Any number of memory devices may be used to provide for a given amount of system memory. A storage 758 may also couple to the processor 752 via the interconnect 755 to provide for persistent storage of information such as data, applications, operating systems, and so forth. In an example, the storage 758 may be implemented as non-volatile storage such as a solid-state disk drive (SSD).

The components may communicate over the interconnect 755. The interconnect 755 may include any number of technologies, including industry-standard architecture (ISA), extended ISA (EISA), peripheral component interconnect (PCI), peripheral component interconnect extended (PCIx), PCI express (PCIe), Compute Express Link (CXL), or any number of other technologies. The interconnect 755 may couple the processing units 752, 754 to a transceiver 766, for communications with connected edge devices 762.

The transceiver 766 may use any number of frequencies and protocols. For example, a wireless local area network (WLAN) unit may implement Wi-Fi® communications in accordance with the Institute of Electrical and Electronics Engineers (IEEE) 802.11 standard, or a wireless wide area network (WWAN) unit may implement wireless wide area communications according to a cellular, mobile network, or other wireless wide area protocol. The wireless network transceiver 766 (or multiple transceivers) may communicate using multiple standards or radios for communications at a different range. A wireless network transceiver 766 (e.g., a radio transceiver) may be included to communicate with devices or services in the edge cloud 110 or the cloud 130 via local or wide area network protocols.

The communication circuitry (e.g., transceiver 766, network interface 768, external interface 770, etc.) may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, Matter®, low-power wide-area network (LPWAN) or low-power wide-area (LPWA) protocols, etc.) to effect such communication. Given the variety of types of applicable communications from the device to another component or network, applicable communications circuitry used by the device may include or be embodied by any one or more of components 766, 768, or 770. Accordingly, in various examples, applicable means for communicating (e.g., receiving, transmitting, etc.) may be embodied by such communications circuitry.

The computing device 750 may include or be coupled to acceleration circuitry 764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 755 may couple the processing units 752, 754 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as LEDs or more complex outputs such as display screens (e.g., LCD screens), with the output of characters, graphics, multimedia objects, and the like being generated or produced from the operation of the edge computing node 750.

A battery 776 may power the edge computing node 750, although, in examples in which the edge computing node 750 is mounted in a fixed location, it may have a power supply coupled to an electrical grid, or the battery may be used as a backup or for temporary capabilities. A battery monitor/charger 778 may be included in the edge computing node 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. A power block 780, or other power supply coupled to a grid, may be coupled with the battery monitor/charger 778 to charge the battery 776.

In an example, the instructions 782 on the processing units 752, 754 (separately, or in combination with the instructions 782 of the machine-readable medium 760) may configure execution or operation of a trusted execution environment (TEE) 790. In an example, the TEE 790 operates as a protected area accessible to the processing units 752, 754 for secure execution of instructions and secure access to data. Other aspects of security hardening, hardware roots-of-trust, and trusted or protected operations may be implemented in the edge computing node 750 through the TEE 790 and the processing units 752, 754.

The computing device 750 may be a server, appliance computing devices, and/or any other type of computing device with the various form factors discussed above. For example, the computing device 750 may be provided by an appliance computing device that is a self-contained electronic device including a housing, a chassis, a case, or a shell.

In an example, the instructions 782 provided via the memory 756, the storage 758, or the processing units 752, 754 may be embodied as a non-transitory, machine-readable medium 760 including code to direct the processor 752 to perform electronic operations in the edge computing node 750. The processing units 752, 754 may access the non-transitory, machine-readable medium 760 over the interconnect 755. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processing units 752, 754 to perform a specific sequence or flow of actions, for example, as described with respect to the flowchart(s) and block diagram(s) of operations and functionality discussed herein. As used herein, the terms "machine-readable medium", "machine-readable storage", "computer-readable storage", and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers.

In further examples, a software distribution platform (e.g., one or more servers and one or more storage devices) may be used to distribute software, such as the example instructions discussed above, to one or more devices, such as example processor platform(s) and/or example connected edge devices noted above. The example software distribution platform may be implemented by any computer server, data facility, cloud service, etc., capable of storing and transmitting software to other computing devices. In some examples, the providing entity is a developer, a seller, and/or a licensor of software, and the receiving entity may be consumers, users, retailers, OEMs, etc., that purchase and/or license the software for use and/or re-sale and/or sub-licensing.

In some examples, the instructions are stored on storage devices of the software distribution platform in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions stored in the software distribution platform are in a first format when transmitted to an example processor platform(s). In some examples, the first format is an executable binary in which particular types of the processor platform(s) can execute. However, in some examples, the first format is uncompiled code that requires one or more preparation tasks to transform the first format to a second format to enable execution on the example processor platform(s). For instance, the receiving processor platform(s) may need to compile the computer readable instructions in the first format to generate executable code in a second format that is capable of being executed on the processor platform(s). In still other examples, the first format is interpreted code that, upon reaching the processor platform(s), is interpreted by an interpreter to facilitate execution of instructions.

Delegated and Failover Orchestration using IPUs

With some existing approaches, edge computing systems that operate containers and microservices are managed with a Kubernetes "controlling" or "primary" node (also in some literature referred to as a "master" node), which manages a group of distributed nodes. However, one of the challenges that can occur is that connectivity to the controlling node may experience some level of disruption. During such disruption, certain types of control loops, quality of service management, or global observability may be disrupted.

The following proposes techniques to enable infrastructure components—including IPUs, switches, or any set of delegated nodes which can execute logic—to act as an orchestrator failover (a backup orchestrator) for the basic flows that must occur to keep the system running A backup orchestrator can also notify edge nodes that they may receive some actions to be performed by third party, trusted back-up orchestration elements (which may be registered). Among other actions, each of the back-up orchestrators allow registering certain orchestration rules, monitoring services, and applying certain action(s) if an SLO is not satisfied.

As discussed in the following examples, a designated element (node or entity) who operates as a backup orchestrator may perform monitoring to ensure that disruption to a current orchestration controller is not occurring. If disruption occurs, rules can be structured to automatically trigger the start of a micro-service to perform that delegated function. These and other types of failover management are addressed in the following.

The following refers to the use of a "primary" or "controller" node or entity who operates as the main orchestrator, and at least one "secondary," "backup," or "failover" node or entity who operates as the replacement node. It will be understood that a "primary" or "controller" node is interchangeable with a "master" node, "coordinator" node, "supervising" node, "managing" or "manger" node, "higher level" node, etc.

A variety of technical benefits and implementations are introduced by the following. As a first example, memory information, such as "dirty" pages (i.e., pages that have modified data that are not yet moved from memory to disk) can be made available at an IPU to enable the IPU to provide check-pointing for virtual network functions (VNFs) or container network functions (CNFs) running on the host. Such check-pointing can be sub-divided to a smaller granularity than a page itself, because some applications (e.g., DPDK based applications) use very large pages to optimize their performance and there is no need to transfer a full page if only few states have changes. Also, an IPU can perform this evaluation continuously to be made aware of state changes in real-time and with a small epoch. As a result, the IPU can send this memory information to an CPU/IPU set providing redundancy for a particular VNF/CNF. The generation of this information at the IPU level would guarantee almost immediate state replication on the IPUs running the mirror copies of the VNF/CNF.

In further examples, there may be a constant heartbeat-like handshake between the backup orchestration element and the controller orchestration element to allow for a broader set of back up options. This heartbeat-like feature can enable the backup orchestration element to be aware of a failure, so that it can trigger the predefined rule. For example, the backup orchestration element may trigger some remediation if, for example, it does not hear back for N heartbeat cycles.

Also, in further examples, the backup orchestration element can provide options to a network infrastructure to handle various use cases where the original orchestration node comes back up after some temporary failure. The original orchestration node may be delegated to a backup role in this use case (i.e., the failure causes the two orchestration nodes to switch roles). If M cycles of time pass without the backup orchestration being deployed, a decision may be made to no longer run in a backup mode and migrate the container/microservice.

Figure 8:
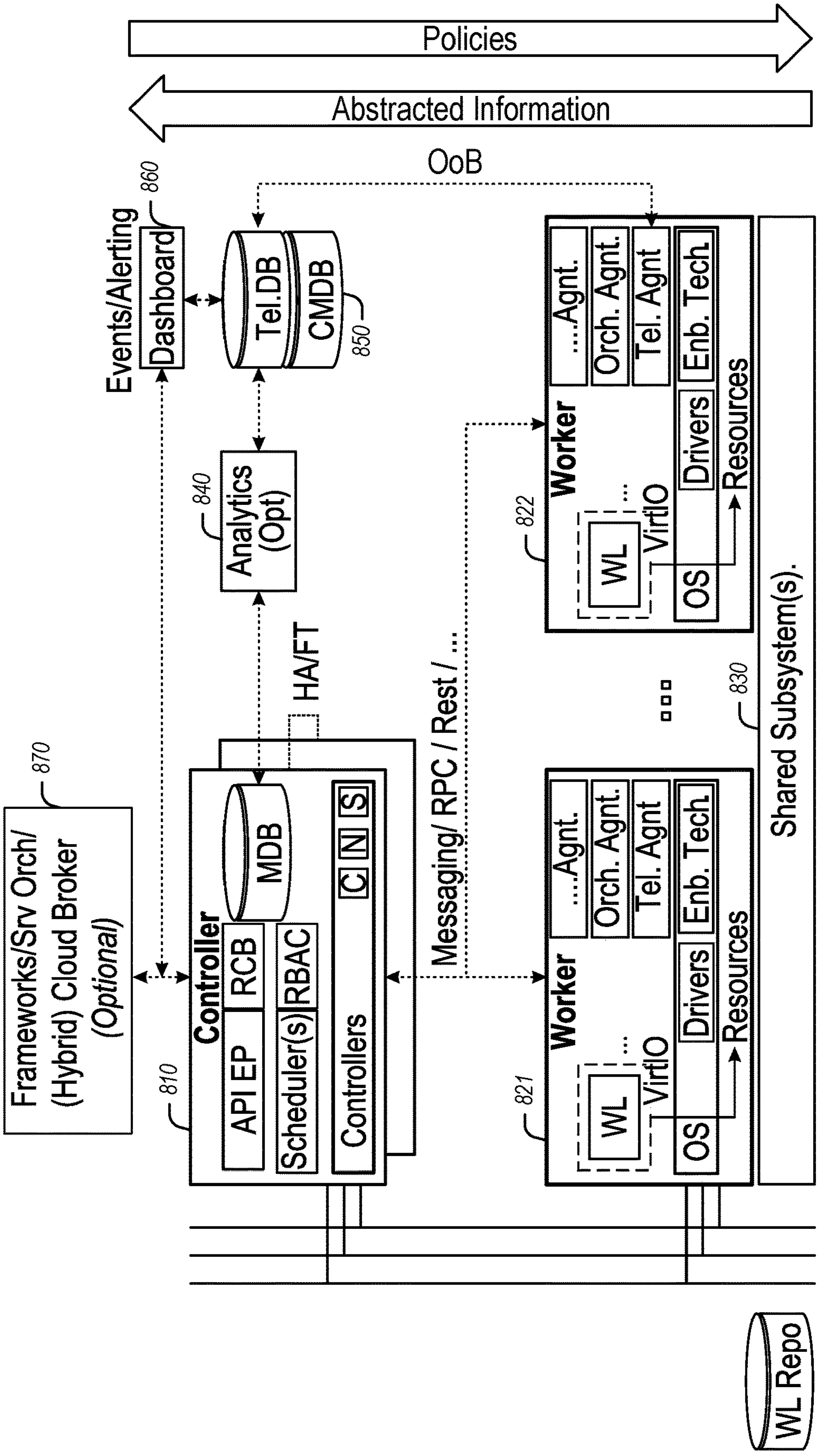
FIG. 8 depicts a single-site architecture for implementation of orchestration and management, according to an example.
Figure 9:
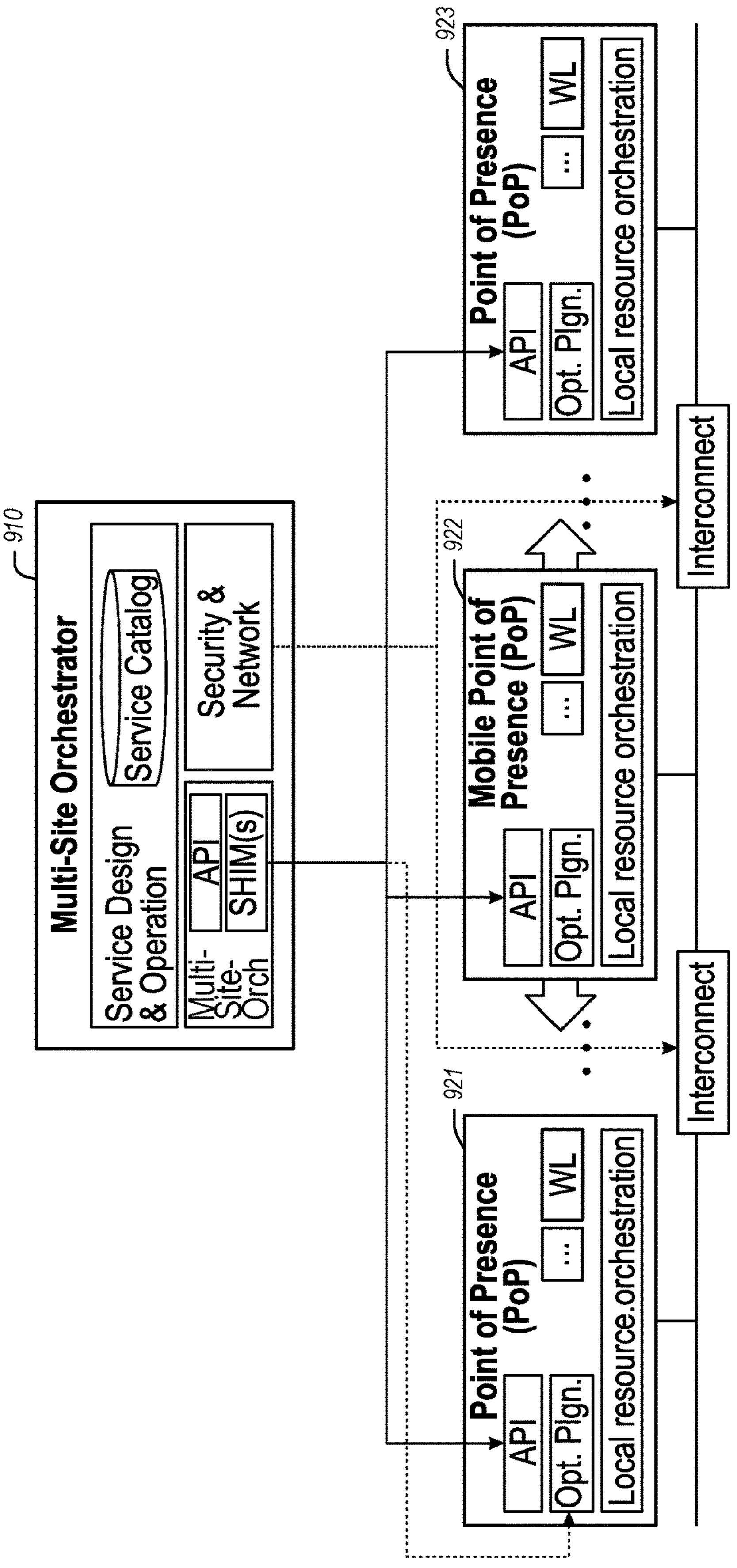
FIG. 9 depicts a multi-site architecture for implementation of orchestration and management, according to an example.
Figure 10:
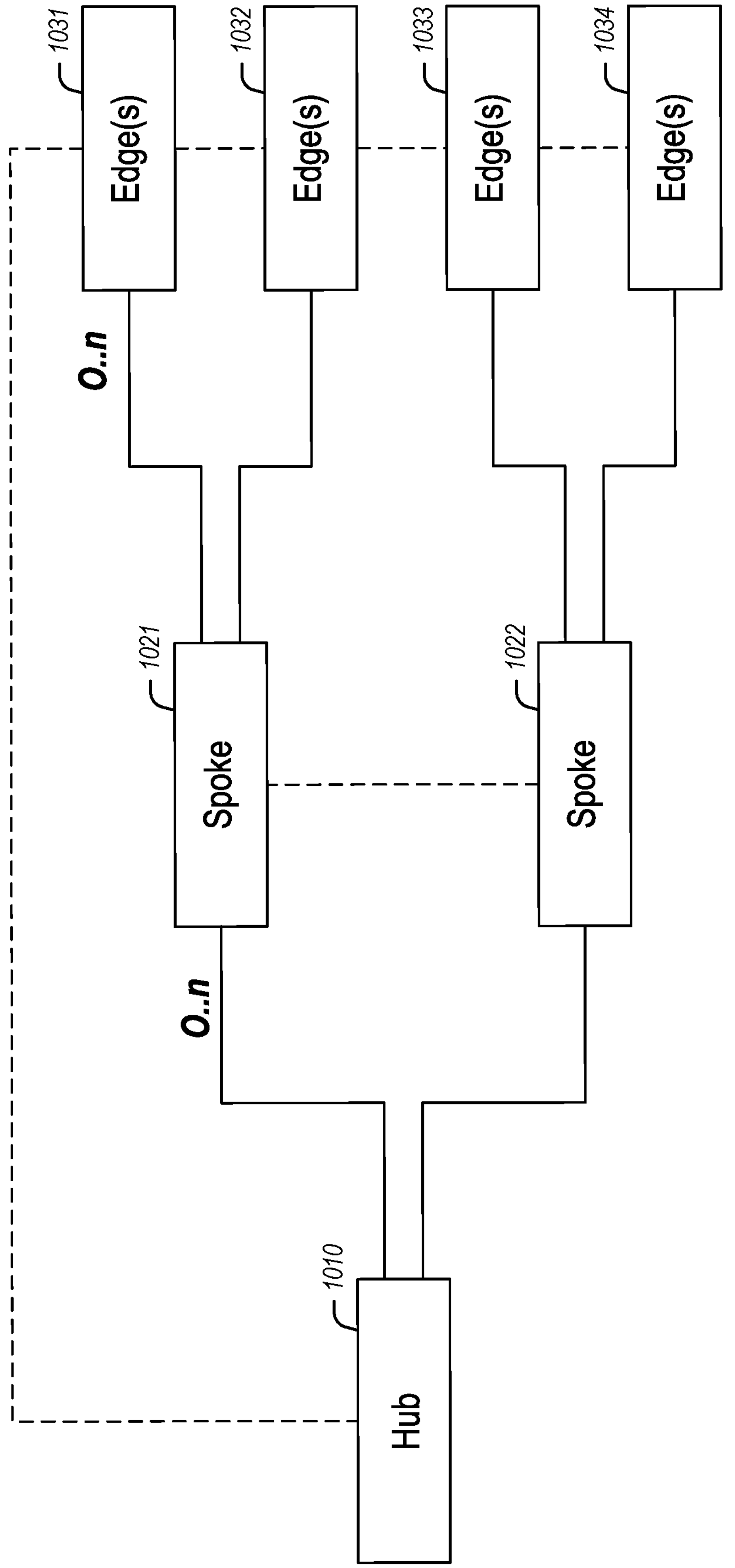
FIG. 10 depicts an edge-of-tiers (hierarchical) approach for implementation of orchestration and management, according to an example.

FIGS. 8 to 10 provide examples of various network taxonomies for orchestration and management of distributed computing systems, which may be deployed among cloud, edge-cloud, edge, or distributed edge environments. Each of these diagrams provide general layouts for components used to implement orchestration failover components as discussed herein. As will be described below, there are a combination of different roles (e.g. worker node, controller/primary node, meta-orchestrator etc.) relevant to orchestration and service deployment that can be mapped in different parts of the architecture.

FIG. 8 depicts an example single-site architecture for implementation of orchestration and management, as discussed herein. This architecture includes basic flows and components of an orchestration and management stack that can be used within a single location/Point-of-Presence (PoP). This architecture arrangement follows a classical Primary-Secondary architecture (Controller-Worker architecture) and can be mapped to various orchestration solutions, including but not limited to, OpenStack, Kubernetes, Mesos, and the like.

In this example, a controller 810 operates as an orchestrator for a plurality of workers in the site. As an example, a set of workers 821, 822 operate workloads (WLs) and include a number of agents (e.g., orchestration agents, telemetry agents, etc.), operating among the workers 821, 822 in one or more shared subsystems 830. The controller 810 may provide its data for optional analytics 840, including with telemetry data stored in a telemetry database 850 and accessible via an events/alerting dashboard 860. The controller 810 may optionally interface with other frameworks or service orchestrators, such as a cloud broker 870 (e.g., a cloud broker that operates with hybrid cloud-edge orchestration).

Controllers and schedulers (such as those provided at controller 810) are important components to translate SLOs into specific polices. The individual agents and drivers (such as those provided at the workers 821, 822) enable the components to use the specific polices. Security considerations relevant to privacy impacts and Edge security building blocks are also provided among these components, as noted below.

In an example, to provide service performance and enable service assurance in the single-site architecture, the following technologies are enabled for orchestration management. A first technology includes the enablement of special purpose hardware (e.g., acceleration circuitry) and platform features to be orchestrated in a management stack. Examples for this include the inclusion of device drivers for Kubernetes to support FPGAs.

Another technology includes support for high precision orchestration and scheduling through (longer) running observations in a background flow. This background flow may be paired with a runtime-driven foreground flow in which fine-grained service request and re-balancing decisions are processed. Such background flow can be enabled by observability of the full stack. This is mainly achieved by telemetry toolkits but also can be accompanied by tools providing details on specifics of the entities and their relationships in place (e.g., through metadata). Based on the data retrieved from such systems, observations can be made, and models (including AI/ML-based models), derived and fed back as insights into decision-making entities (such as a Kubernetes scheduler, Planning components, Service Mesh Controllers, etc.). Furthermore, this enables alerting and dashboarding to support site reliability engineering (SRE).

Components belonging to the control plane can be executed on a single node or executed on multiple nodes. Also, components can be executed on nodes acting as control planes nodes, or nodes that enable high availability/fault tolerance (HA/FT) of the control plane. While the example in FIG. 8 depicts a deployment of the controller 810 using multiple compute nodes, it is possible to provide this deployment in a single node configuration. Also, the footprint of the orchestration stack itself can vary while offering the same kind of interface. For example, in case of Kubernetes, K3s (the Lightweight Kubernetes distribution) can be used on smaller devices, while offering similar functionalities than a (managed) Kubernetes deployment.

FIG. 9 depicts an example multi-site architecture for implementation of orchestration and management. This architecture defines some of the components used to achieve a multi-site deployment, including a multi-site orchestrator 910 and points of presence 921, 922, 923 (PoPs). Note, in some scenarios, the individual PoPs 921, 922, 923 may be mobile. However, this example demonstrates a hierarchical, top-down managed approach as the baseline. Among other considerations, the following may play a role when dealing with multi-site setups: support for hierarchical management; support for integration of various resource orchestration technologies or revisions; and enabling end-to-end orchestration, by support for optimal placement, scheduling of service components regarding resource constraints, data locality, and SLO requirements.

From an end-to-end perspective of service assurance and enabling high levels of QoS, the correct policies and settings can be translated from the top-down and broken into individual policies and settings for the individual components. Overall monitoring and SLA management, Rating, Charging & Billing (RCB), and the possible remediation on SLA violations are handled at this level. However, the individual single-sites must report the correct (and enough) abstracted information to the higher layers. Furthermore, assurance of security and trust will be evaluated.

FIG. 10 depicts an Edge-of-Tiers (hierarchical) approach for implementation of orchestration and management. Specifically, this may be implemented as a hub and spoke (hierarchy) model, where a hub 1010 operates with 0-n spokes (e.g., spokes 1021, 1022), and each of the spokes connect to 0-n edges (e.g., edges 1031, 1032, 1033, 1034). This hierarchical arrangement further refines data flows and supports various east-west and north-south traffic patterns. Even in this organized scenario, the presently discussed orchestration and management operations may be usefully deployed.

Figure 11:
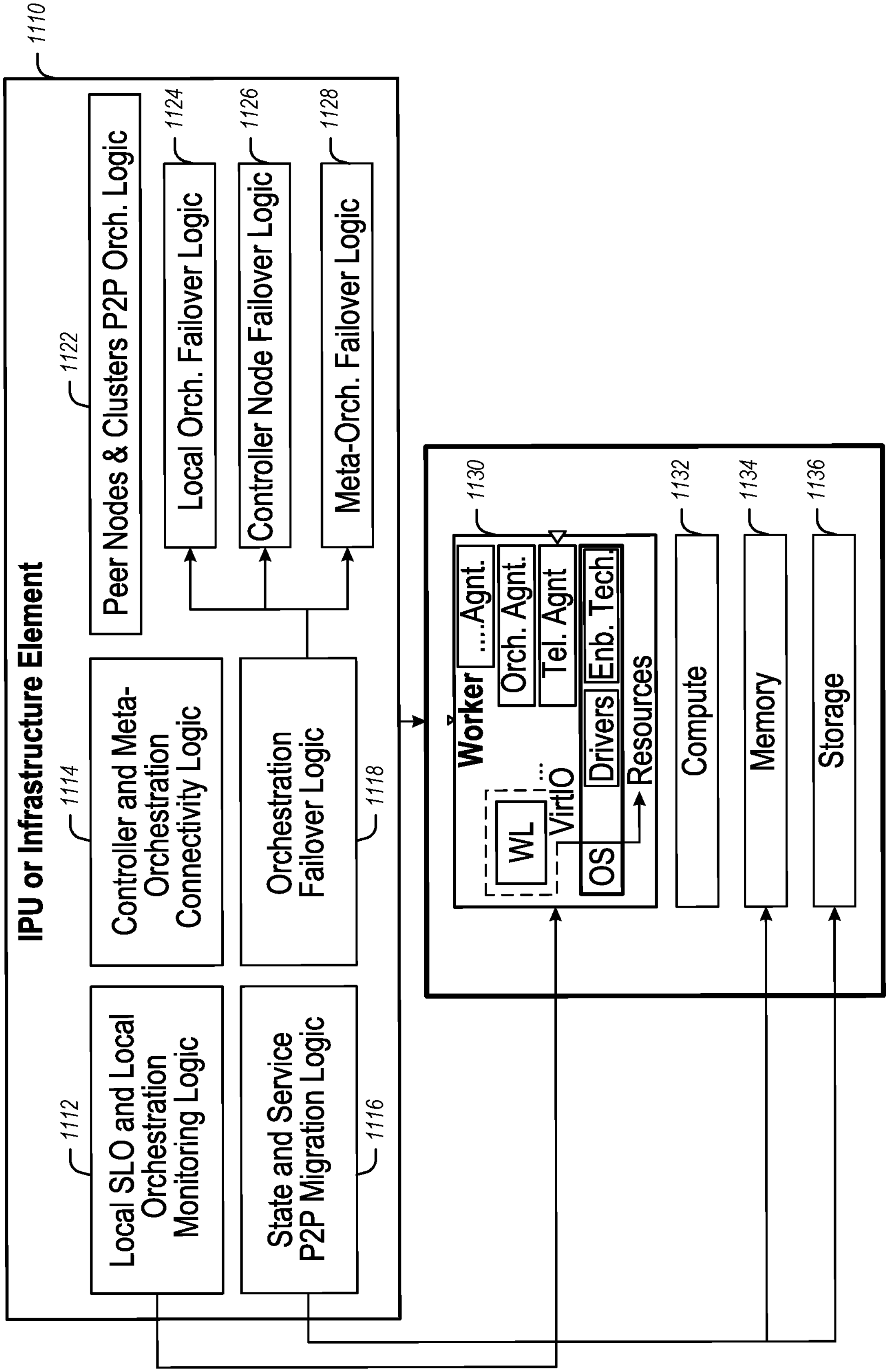
FIG. 11 depicts a layout of additional building blocks of the presently described architectures for failover orchestration, according to an example.

FIG. 11 depicts a layout of example building blocks of the presently described architectures for failover orchestration. These building blocks may be implemented by a set of infrastructure functionalities that could reside on an IPU, switches, or other networked locations.

These new infrastructure functionalities are responsible to act transparently when different parts of the orchestration architecture fail or have transient problems (e.g., connectivity, load, reboot etc.). In various examples, an IPU or other infrastructure element 1110 are provided with logic to provide these functionalities. As non-limiting examples, some of the logic components include:

- Local SLO and Local Orchestration Monitoring Logic 1112;
- Primary Controller and Meta-Orchestration Connectivity Logic 1114;
- State and Service Peer-to-Peer Migration Logic 1116;
- Orchestration Failover Logic 1118 (which controls Local Orchestration Failover Logic 1124; Controller Node Failover Logic 1126; Meta-Orchestration Failover Logic 1128); and
- Peer Nodes and Clusters Peer-to-Peer Orchestration Logic 1122.

Some of the example scenarios and functionality that may be addressed with this architecture include the following.

Non-responsive Life-cycle Management. Consider a first scenario where orchestration logic (e.g. an orchestration agent in Worker 1130, which includes compute 1132, memory 1134, and storage 1136 resources) is not responsive and cannot perform life cycle management of the workloads running in the local node. In this scenario, the Local SLO and Local Orchestration Monitoring Logic 1112 identifies that the orchestration agent logic at the worker (e.g., Worker 1130) is not operating correctly. This can be coordinated by having the orchestration agent at the Worker 1130 generate some heartbeats in some area of memory, such as in memory 1134 that is accessible by the IPU or Infrastructure Element 1110 via an interconnect such as compute express link (CXL) or remote dynamic memory access (RDMA).

In an example, the Orchestration Failover Logic 1118 may activate the Local Orchestration Failover Logic 1124 to perform life cycle management of the local services on behalf of the local worker until the situation is resolved. This may include the SLO being monitored and performing mitigation actions when the SLO is not satisfied. For example, this mitigation may include connecting to a peer's worker nodes that have resources via the Peer Nodes & Clusters P2P Orchestration Logic 1122 and migrating the service using State and Service P2P Migration Logic 1116 to the other node. The controller node then can be notified that the worker node (e.g., Worker 1130) may not be working anymore, and can wait for a fix to be provided to the worker node. In further examples, the logic may include mechanisms to restart the orchestration logic.

Non-responsive Service. Consider a second scenario where the orchestration logic (e.g. an orchestration agent in Worker 1130) is not responsive and a service is not responding. In this case, the controller node must be notified that the worker node may not be working anymore and wait for a fix to the worker. Here, the logic, such as Orchestration Failover Logic 1118, reaches out to peer worker nodes that have resources via the Peer Nodes & Clusters P2P Orchestration Logic 1122. The service then can be migrated to the other peer worker node(s) using State and Service P2P Migration Logic 1116. In some examples, to properly migrate the service, the Orchestration Logic may need to access the memory and storage of the worker node to fully migrate the current state of the services.

In further examples, the logic may provide an additional mechanism for handling a scenario when the service becomes responsive again at the original worker node. For instance, once the service or appliance becomes responsive, the Orchestration Failover Logic 1118 may identify requests that were received by the service or appliance and that have generated a response which needs to be discarded. (These responses do not need to be provided because the requests were already sent to the failover node for processing). Accordingly, the IPU may include functionality to track—at a high level—the requests that are provided to the respective services and the responses that are generated in response to these requests.

Non-responsive Controller Node. Consider a third scenario where a controller node that is responsible to manage worker nodes is not responsive, and the local worker node requires some action that, in theory, needs to be handled or initiated by the controller node. Here, the Controller and Meta-Orchestration Connectivity Check Logic 1114 will detect that the controller node is not responsive. This could be similarly implemented via heartbeats done in pings, as communicated by RDMA or similar methods.

In this example, the Controller Node Failover Logic 1126 is responsible to provide a failover implementation of the most important functionalities of the controller node. Examples of such functionalities could include: identifying new peers nodes where to migrate services; configuring new resources; or providing access to k8s operators or plugins.

The Controller Node Failover Logic 1126 will intercept traffic from the worker node targeting the controller node and performing the action requested by the worker node. The Controller Node Failover Logic 1126 also performs notification to the meta-orchestration to notify that the controller node may be down. Similar to the non-responsive service scenario above, the Controller Node Failover Logic 1126 may have capabilities to re-start the controller logic at a controller node. For example, the IPU where the controller is hosted may provide a mechanism to perform this type of a restart.

Non-responsive Meta-Orchestration Node. Consider a fourth scenario where a meta-orchestration node that is responsible to perform certain activities across clusters is not responsive. For example, consider an example where a local controller needs to migrate a node to another cluster. The local controller may need to reach out to the meta-orchestrator to do so.

In this example, the flow to respond to this scenario would be very similar to the Non-responsive Controller Node scenario, above. However, in this case, there is not another upper entity that can address the problem. As a result, the Meta-Orchestration Failover Logic 1128 may generate a notification to the infrastructure owner. Other automated or pre-programmed notifications or actions may also be taken in this scenario.

Figure 12:
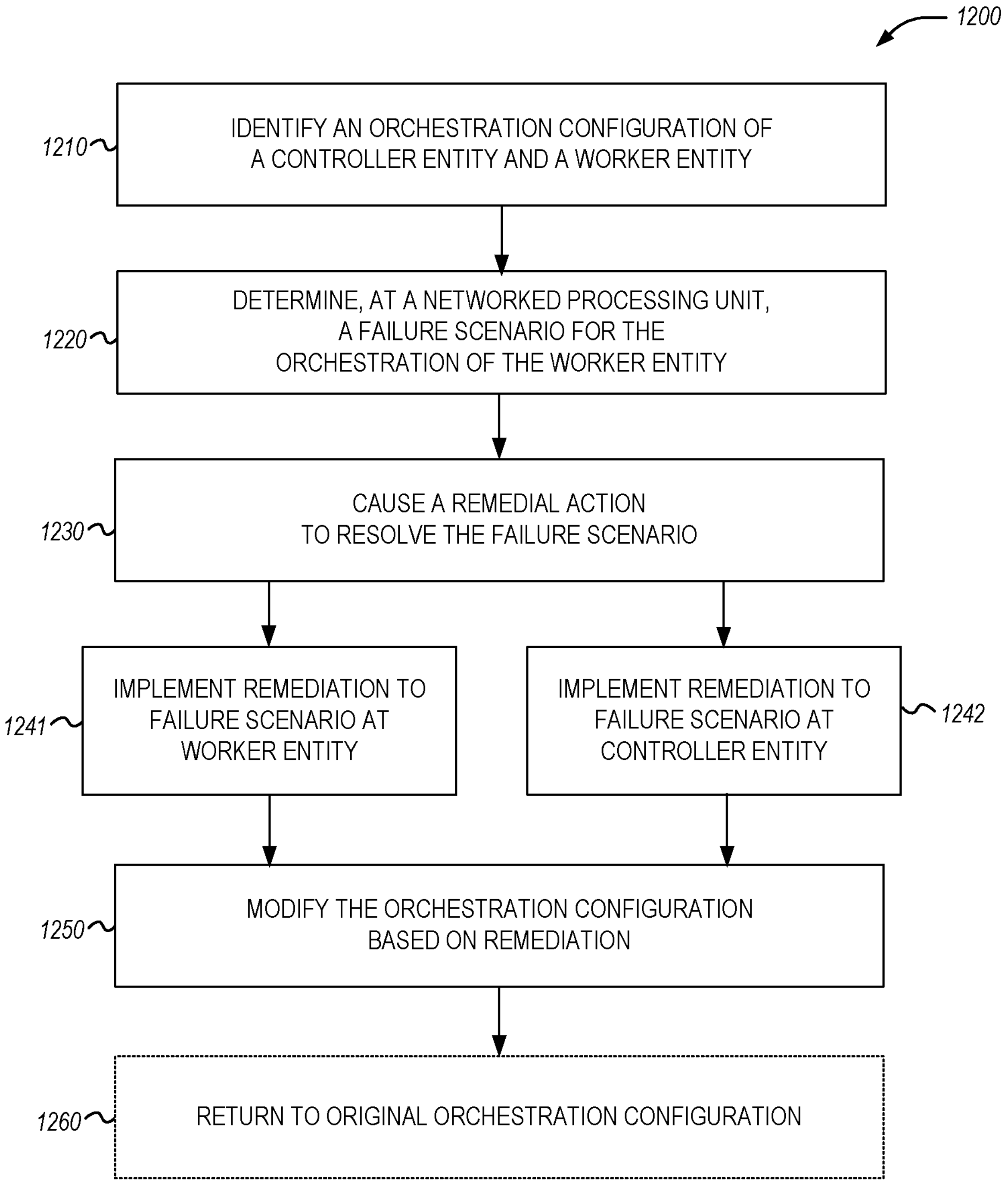
FIG. 12 depicts a flowchart of a method for deploying and operating failover logic for an orchestration backup, according to an example.

FIG. 12 depicts a flowchart of an example method 1200 for deploying and operating failover logic for an orchestration backup. The method 1200 may be implemented by one or more networked processing units (e.g., IPUs) or other forms of processing circuitry, and instructions embodied thereon to be executed by the networked processing unit(s) (or processing circuitry), consistent with the examples and functionality of networked processing units, as discussed above. Specifically, the one or more networked processing units may be provided in a network of at least one orchestrated edge computing environment, as the one or more networked processing units coordinate remedial actions for failure scenarios occurring in the at least one orchestrated edge computing environment. Consistent with the examples above, the one or more networked processing units may be implemented at a network interface in a gateway or switch.

At 1210, operations are performed to identify an orchestration configuration (or, to determine this orchestration configuration, or to retrieve data for this orchestration configuration) of a controller entity and a worker entity. A variety of data representations or data sources (e.g., databases, files, objects) may be used to represent (e.g., store, select, retrieve, provide) the orchestration configuration information so that the networked processing unit can determine an accurate state of the orchestration configuration in the network. In an example orchestration configuration, the controller entity is responsible for orchestration of the worker entity to provide at least one service. For instance, the worker entity may provide at least one microservice using at least one container, although other application or service configurations may be provided.

At 1220, operations are performed to determine a failure scenario for the orchestration of the worker entity, such as based on network data received at the networked processing unit in the network established between the controller entity and the worker entity. In an example, the failure scenario is determined in response to interruption of a heartbeat at the controller entity or the worker entity.

In a specific example, the failure scenario includes an event where at least one life cycle management feature of the at least one service provided by the worker entity is not responsive. In another example, the failure scenario includes an event where the at least one service provided by the worker entity is not responsive. In another example, the failure scenario includes an event where the controller entity is not responsive. In yet another example, the failure scenario includes an event where the controller entity is not responsive.

At 1230, operations are performed to cause a remedial action to resolve the failure scenario. This remedial action operates to resolve the failure scenario and modify the orchestration configuration (e.g., replacing functionality of the controller entity with functionality at a replacement entity, or replacing functionality of the worker entity with functionality at a replacement entity). These two scenarios are depicted at 1241, with operations performed to: implement a remediation to the failure scenario at the worker entity; or at 1242, implement a remediation to the failure scenario at the controller entity. In the example where failure of a service occurs, additional operations may be performed to causes tracking of service requests associated with the failure scenario, and coordinate the tracked service requests among the worker entity and the replacement entity.

At 1250, operations are performed to modify the orchestration configuration based on remediation. In the example where the at least one life cycle management feature of the at least one service provided by the worker entity is not responsive, the remedial action causes the at least one life cycle management feature to be performed at the .replacement entity. In the example where the at least one service provided by the worker entity is not responsive, the remedial action causes the at least one service to be migrated to the replacement entity. In the example where the controller entity is not responsive, the remedial action causes the replacement entity to assume control of the orchestration of the worker entity. In the example where the controller entity is not responsive (e.g., and where the controller entity is additionally responsible for orchestration of entities in multiple clusters), the remedial action includes providing a notification to at least one user based on the failure scenario.

At 1260, operations are optionally performed to return to the original orchestration configuration. Other related service or orchestration resumption operations may be performed once the failure scenario has resolved. In still further examples, the results of the failure scenario, and/or the remediation, may be saved and used to improve the operation of the overall system, such as when the failure scenario occurs again. Likewise, other metadata, telemetry data, or results from the failure scenario and/or the remediation may be recorded and retrieved later as part of analysis or proactive remediation operations (e.g., to remediate a predicted failure scenario if similar failure events are occurring).

In various examples, the operations 1210-1260 may be performed in a setting where: the at least one orchestrated edge computing environment is arranged in a single site implementation, and the controller entity operates as an orchestrator for a plurality of workers including the worker entity; or, the at least one orchestrated edge computing environment is arranged in a multiple site implementation, and the controller entity operates as an orchestrator for multiple points of presence including the worker entity; or, the at least one orchestrated edge computing environment is arranged in a hub and spoke hierarchy, and the controller entity operates as an orchestrator for multiple worker entities including the worker entity in the hierarchy.

USE CASES AND ADDITIONAL EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a method performed by a networked processing unit for deploying remedial actions of failure scenarios occurring in at least one orchestrated edge computing environment, comprising: identifying an orchestration configuration of a controller entity and a worker entity, wherein the controller entity is responsible for orchestration of the worker entity to provide at least one service; determining a failure scenario of the orchestration of the worker entity, based on network data received at the networked processing unit in a network established between the controller entity and the worker entity; and causing a remedial action to resolve the failure scenario and modify the orchestration configuration, wherein the remedial action includes replacing functionality of the controller entity or the worker entity with functionality at a replacement entity.

In Example 2, the subject matter of Example 1 optionally includes subject matter where the failure scenario includes an event where at least one life cycle management feature of the at least one service provided by the worker entity is not responsive, and wherein the remedial action causes the at least one life cycle management feature to be performed at the replacement entity.

In Example 3, the subject matter of any one or more of Examples 1-2 optionally include subject matter where the failure scenario includes an event where the at least one service provided by the worker entity is not responsive, and wherein the remedial action causes the at least one service to be migrated to the replacement entity.

In Example 4, the subject matter of Example 3 optionally includes subject matter where the remedial action further causes tracking of service requests associated with the failure scenario, and coordination of the tracked service requests among the worker entity and the replacement entity.

In Example 5, the subject matter of any one or more of Examples 1-4 optionally include subject matter where the failure scenario includes an event where the controller entity is not responsive, and wherein the remedial action causes the replacement entity to assume control of the orchestration of the worker entity.

In Example 6, the subject matter of any one or more of Examples 1-5 optionally include subject matter where the failure scenario includes an event where the controller entity is not responsive, wherein the controller entity is additionally responsible for orchestration of entities in multiple clusters, and wherein the remedial action includes providing a notification to at least one user based on the failure scenario.

In Example 7, the subject matter of any one or more of Examples 1-6 optionally include subject matter where the failure scenario is determined in response to interruption of a heartbeat at the controller entity or the worker entity.

In Example 8, the subject matter of any one or more of Examples 1-7 optionally include subject matter where the at least one orchestrated edge computing environment is arranged in a single site implementation, and wherein the controller entity operates as an orchestrator for a plurality of workers including the worker entity.

In Example 9, the subject matter of any one or more of Examples 1-8 optionally include subject matter where the at least one orchestrated edge computing environment is arranged in a multiple site implementation, and wherein the controller entity operates as an orchestrator for multiple points of presence including the worker entity.

In Example 10, the subject matter of any one or more of Examples 1-9 optionally include subject matter where the at least one orchestrated edge computing environment is arranged in a hub and spoke hierarchy, and wherein the controller entity operates as an orchestrator for multiple worker entities including the worker entity in the hierarchy.

In Example 11, the subject matter of any one or more of Examples 1-10 optionally include subject matter where the worker entity provides at least one microservice using at least one container.

In Example 12, the subject matter of any one or more of Examples 1-11 optionally include subject matter where the networked processing unit is implemented at a network interface in a gateway or switch.

In Example 13, the subject matter of Example 12 optionally includes subject matter where the controller entity and the worker entity each include respective processing circuitry and respective network processing units, and wherein the remedial action is performed based on operations invoked by the method at one or more of the respective network processing units.

Example 14 is a device, comprising: a networked processing unit connected to a network of at least one orchestrated edge computing environment; and a storage medium including instructions embodied thereon, wherein the instructions, which when executed by the networked processing unit, configure the networked processing unit to deploy remedial actions for failure scenarios occurring in the at least one orchestrated edge computing environment, with operations to: retrieve (e.g., obtain data) for an orchestration configuration of a controller entity and a worker entity, wherein the controller entity is responsible for orchestration of the worker entity to provide at least one service; determine a failure scenario of the orchestration of the worker entity, based on network data received at the networked processing unit, the networked processing unit located in the network between the controller entity and the worker entity; and cause a remedial action to resolve the failure scenario and modify the orchestration configuration, wherein the remedial action includes replacing functionality of the controller entity or the worker entity with functionality at a replacement entity.

In Example 15, the subject matter of Example 14 optionally includes subject matter where the failure scenario includes an event where at least one life cycle management feature of the at least one service provided by the worker entity is not responsive, and wherein the remedial action causes the at least one life cycle management feature to be performed at the replacement entity.

In Example 16, the subject matter of any one or more of Examples 14-15 optionally include subject matter where the failure scenario includes an event where the at least one service provided by the worker entity is not responsive, and wherein the remedial action causes the at least one service to be migrated to the replacement entity.

In Example 17, the subject matter of Example 16 optionally includes subject matter where the remedial action further causes tracking of service requests associated with the failure scenario, and coordination of the tracked service requests among the worker entity and the replacement entity.

In Example 18, the subject matter of any one or more of Examples 14-17 optionally include subject matter where the failure scenario includes an event where the controller entity is not responsive, and wherein the remedial action causes the replacement entity to assume control of the orchestration of the worker entity.

In Example 19, the subject matter of any one or more of Examples 14-18 optionally include subject matter where the failure scenario includes an event where the controller entity is not responsive, wherein the controller entity is additionally responsible for orchestration of entities in multiple clusters, and wherein the remedial action includes providing a notification to at least one user based on the failure scenario.

In Example 20, the subject matter of any one or more of Examples 14-19 optionally include subject matter where the failure scenario is determined in response to interruption of a heartbeat at the controller entity or the worker entity.

In Example 21, the subject matter of any one or more of Examples 14-20 optionally include subject matter where the at least one orchestrated edge computing environment is arranged in one of: a single site implementation where the controller entity operates as an orchestrator for a plurality of workers including the worker entity; a multiple site implementation where the controller entity operates as an orchestrator for multiple points of presence including the worker entity; or a hub and spoke hierarchy, and wherein the controller entity operates as an orchestrator for multiple worker entities including the worker entity in the hierarchy.

In Example 22, the subject matter of any one or more of Examples 14-21 optionally include subject matter where the device is a gateway or switch, wherein the controller entity and the worker entity each include respective processing circuitry and respective network processing units, and wherein the remedial action is performed based on operations invoked at one or more of the respective network processing units.

Example 23 is a machine-readable medium (e.g., a non-transitory storage medium) comprising information (e.g., data) representative of instructions, wherein the instructions, when executed by processing circuitry, cause the processing circuitry to perform, implement, or deploy any of Examples 1-22.

Example 24 is an apparatus of an edge computing system comprising means to implement any of Examples 1-23, or other subject matter described herein.

Example 25 is an apparatus of an edge computing system comprising logic, modules, circuitry, or other means to implement any of Examples 1-23, or other subject matter described herein.

Example 26 is a networked processing unit (e.g., an infrastructure processing unit as discussed here) or system including a networked processing unit, configured to implement any of Examples 1-23, or other subject matter described herein.

Example 27 is an edge computing system, including respective edge processing devices and nodes to invoke or perform any of the operations of Examples 1-23, or other subject matter described herein.

Example 28 is an edge computing system including aspects of network functions, acceleration functions, acceleration hardware, storage hardware, or computation hardware resources, operable to invoke or perform the use cases discussed herein, with use of any Examples 1-23, or other subject matter described herein.

Example 29 is a system to implement any of Examples 1-28.

Example 30 is a method to implement any of Examples 1-28.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A method performed by a network processing unit for deploying remedial actions of failure scenarios occurring in at least one orchestrated edge computing environment, comprising:

identifying an orchestration configuration of a controller entity and a worker entity, wherein both the controller entity and the worker entity include: (i) respective compute processing units to execute at least one service and (ii) respective network processing units to process network communication between the controller entity and the worker entity, and wherein the controller entity is responsible for orchestration of the worker entity to provide the at least one service;

determining a failure scenario of the orchestration of the worker entity, based on network data received at the network processing unit in a network established between the controller entity and the worker entity; and causing a remedial action to resolve the failure scenario and modify the orchestration configuration, wherein the remedial action includes replacing functionality of the controller entity or the worker entity with functionality at a replacement entity, wherein the remedial action is performed by at least one of the respective network processing units of the controller entity or the worker entity.

2. The method of claim 1, wherein the failure scenario includes an event where at least one life cycle management feature of the at least one service provided by the worker entity is not responsive, and wherein the remedial action causes the at least one life cycle management feature to be performed at the replacement entity.

3. The method of claim 1, wherein the failure scenario includes an event where the at least one service provided by the worker entity is not responsive, and wherein the remedial action causes the at least one service to be migrated to the replacement entity.

4. The method of claim 3, wherein the remedial action further causes tracking of service requests associated with the failure scenario, and coordination of the tracked service requests among the worker entity and the replacement entity.

5. The method of claim 1, wherein the failure scenario includes an event where the controller entity is not responsive, and wherein the remedial action causes the replacement entity to assume control of the orchestration of the worker entity.

6. The method of claim 1, wherein the failure scenario includes an event where the controller entity is not responsive, wherein the controller entity is additionally responsible for orchestration of entities in multiple clusters, and wherein the remedial action includes providing a notification to at least one user based on the failure scenario.

7. The method of claim 1, wherein the failure scenario is determined in response to interruption of a heartbeat at the controller entity or the worker entity.

8. The method of claim 1, wherein the at least one orchestrated edge computing environment is arranged in a single site implementation, and wherein the controller entity operates as an orchestrator for a plurality of workers including the worker entity.

9. The method of claim 1, wherein the at least one orchestrated edge computing environment is arranged in a multiple site implementation, and wherein the controller entity operates as an orchestrator for multiple points of presence including the worker entity.

10. The method of claim 1, wherein the at least one orchestrated edge computing environment is arranged in a hub and spoke hierarchy, and wherein the controller entity operates as an orchestrator for multiple worker entities including the worker entity in the hierarchy.

11. The method of claim 1, wherein the worker entity provides at least one microservice using at least one container.

12. A device, comprising:

a network processing unit connected to a network of at least one orchestrated edge computing environment; and a storage medium including instructions embodied thereon, wherein the instructions, which when executed by the network processing unit, configure the network processing unit to deploy remedial actions for failure scenarios occurring in the at least one orchestrated edge computing environment, with operations to:

retrieve an orchestration configuration of a controller entity and a worker entity, wherein both the controller entity and the worker entity include: (i) respective compute processing units to execute at least one service and (ii) respective network processing units to process network communication between the controller entity and the worker entity, and wherein the controller entity is responsible for orchestration of the worker entity to provide the at least one service;

determine a failure scenario of the orchestration of the worker entity, based on network data received at the network processing unit, the network processing unit located in the network between the controller entity and the worker entity; and cause a remedial action to resolve the failure scenario and modify the orchestration configuration, wherein the remedial action includes replacing functionality of the controller entity or the worker entity with functionality at a replacement entity, wherein the remedial action is performed by at least one of the respective network processing units of the controller entity or the worker entity.

13. The device of claim 12, wherein the failure scenario includes an event where at least one life cycle management feature of the at least one service provided by the worker entity is not responsive, and wherein the remedial action causes the at least one life cycle management feature to be performed at the replacement entity.

14. The device of claim 12, wherein the failure scenario includes an event where the at least one service provided by the worker entity is not responsive, and wherein the remedial action causes the at least one service to be migrated to the replacement entity.

15. The device of claim 14, wherein the remedial action further causes tracking of service requests associated with the failure scenario, and coordination of the tracked service requests among the worker entity and the replacement entity.

16. The device of claim 12, wherein the failure scenario includes an event where the controller entity is not responsive, and wherein the remedial action causes the replacement entity to assume control of the orchestration of the worker entity.

17. The device of claim 12, wherein the failure scenario includes an event where the controller entity is not responsive, wherein the controller entity is additionally responsible for orchestration of entities in multiple clusters, and wherein the remedial action includes providing a notification to at least one user based on the failure scenario.

18. The device of claim 12, wherein the failure scenario is determined in response to interruption of a heartbeat at the controller entity or the worker entity.

19. The device of claim 12, wherein the at least one orchestrated edge computing environment is arranged in one of:

a single site implementation where the controller entity operates as an orchestrator for a plurality of workers including the worker entity;

a multiple site implementation where the controller entity operates as an orchestrator for multiple points of presence including the worker entity; or a hub and spoke hierarchy, and wherein the controller entity operates as an orchestrator for multiple worker entities including the worker entity in the hierarchy.

20. A non-transitory machine-readable storage medium comprising information representative of instructions, wherein the instructions, when executed by a network processing unit having processing circuitry, cause the processing circuitry to:

obtain data for an orchestration configuration of a controller entity and a worker entity, wherein both the controller entity and the worker entity include: (i) respective compute processing units to execute at least one service and (ii) respective network processing units to process network communication between the controller entity and the worker entity, and wherein the controller entity is responsible for orchestration of the worker entity to provide the at least one service;

determine a failure scenario of the orchestration of the worker entity, based on network data received at the network processing unit in a network established between the controller entity and the worker entity; and cause a remedial action to resolve the failure scenario and modify the orchestration configuration, wherein the remedial action includes replacing functionality of the controller entity or the worker entity with functionality at a replacement entity, wherein the remedial action is performed by at least one of the respective network processing units of the controller entity or the worker entity.

21. The non-transitory machine-readable storage medium of claim 20, wherein the failure scenario includes an event where:

at least one life cycle management feature of the at least one service provided by the worker entity is not responsive, and the remedial action causes the at least one life cycle management feature to be performed at the replacement entity;

the at least one service provided by the worker entity is not responsive, and the remedial action causes the at least one life cycle management feature to be performed at the replacement entity;

the controller entity is not responsive, and the remedial action causes the replacement entity to assume control of the orchestration of the worker entity; or the controller entity is not responsive, and wherein the remedial action includes providing a notification to at least one user based on the failure scenario.

22. The non-transitory machine-readable storage medium of claim 20, wherein the network provides an orchestrated edge computing environment that is arranged in one of:

a single site implementation where the controller entity operates as an orchestrator for a plurality of workers including the worker entity;

a multiple site implementation where the controller entity operates as an orchestrator for multiple points of presence including the worker entity; or a hub and spoke hierarchy where the controller entity operates as an orchestrator for multiple worker entities including the worker entity in the hierarchy.

* * * * *